United States Patent [19]

Middleton

[11] Patent Number: 4,603,582
[45] Date of Patent: Aug. 5, 1986

[54] INERTIAL DYNAMOMETER SYSTEM AND METHOD FOR MEASURING AND INDICATING GROSS HORSEPOWER

[76] Inventor: Harold G. Middleton, 418 SW. 159th St., Seattle, Wash. 98166

[21] Appl. No.: 600,844

[22] Filed: Apr. 16, 1984

[51] Int. Cl.$^4$ ............................................. G01M 15/00
[52] U.S. Cl. .................................... 73/511; 73/862.28
[58] Field of Search ........... 73/862.28, 862.38, 862.53, 73/862.54, 511, 512, 116; 364/426

[56] References Cited

U.S. PATENT DOCUMENTS 3,693,426 9/1972 Little ............................. 73/862.28 X Primary Examiner—Jerry W. Myracle
Attorney, Agent, or Firm—Robert W. Jenny

[57] ABSTRACT

The Inertial Dynamometer System measures and indicates the gross horsepower being produced by a vehicle's prime mover at any instant, accounting for aerodynamic, frictional and viscous drag in addition to gravitational and inertial acceleration factors. The system is adjustable and self calibrating to adapt it to the characteristics of the vehicle in which it is installed. The system allows indication of as many as 21 of the variables involved in measuring and indicating instantaneous gross horsepower. The method for determining gross horsepower is to sum the power used for accelerating the vehicle and the power used for overcoming aerodynamic viscous and frictional losses.

27 Claims, 6 Drawing Figures

INERTIAL DYNAMOMETER SYSTEM AND METHOD FOR MEASURING AND INDICATING GROSS HORSEPOWER

BACKGROUND OF THE INVENTION

1. Field of the Art

This invention is in the field of power measurement using dynamometers and, more specifically, inertial dynamometers. With inertial dynamometers the power being generated by a prime mover is measured by adding the results of the use of the power rather than by absorption of the power and measurement of the energy absorbed. The invention also is in the field of sensors, electronics and display means used in the implementation of dynamometer systems.

2. Prior Art

There is a large amount of prior art in these fields. Only the art considered to be directly pertinent and closest to the subject invention is cited and discussed, along with the following discussion of basics.

The basic methods for the measurement of horsepower have remained unchanged for over a century. They, for the most part, have been dedicated to the measurement of horsepower under stationary conditions. Although there have been methods by which horsepower could be determined under dynamic conditions, their use has generally been encumbered by various shortcomings. It became apparent in recent years that there was a need for an improved method and an apparatus that would both measure the horsepower of the prime mover and determine the drag characteristics of a moving vehicle. Attempts have been made at satisfying the above needs, but these attempts have fallen short of providing a new and complete method and apparatus for the measurement of prime mover horsepower and related dynamic vehicular characteristics of a moving vehicle. The methods and apparatuses of the prior art are discussed below, citing the advantages and disadvantages of each.

The horsepower of a prime mover, i/e: an engine or motor, has usually been determined with an absorption dynamometer. This class of dynamometer uses an absorption unit to dissipate horsepower in the form of heat and is generally restricted to prime movers with a rotary type of output. During the process of testing, the torque (lb/ft) and rpm are measured and Horsepower is then derived via mathematical procedure. With this method:

$$\text{Horsepower} = (\text{torque} \times \text{rpm})/5252 \qquad (a)$$

There are two basic styles of absorption dynamometers: the engine dynamometer, which takes horsepower directly from the prime mover, and the chassis dynamometer, which takes horsepower from the drive wheels of the vehicle. The above absorption dynamometers are noted for their high accuracy of measurement but they also have several drawbacks, as follows:

They are limited to stationary operation as they are not capable of measuring the horsepower of the prime mover in a moving vehicle.

The horsepower values are valid only at the time of testing and the procedure must be repeated if future tests are required.

The engine dynamometer often requires the removal of the prime mover from the vehicle.

They are frequently abusive to the prime mover as they often require runs at peak horsepower for sustained periods in order to obtain readings.

They do not test the prime mover under real world conditions. i/e: Driving the vehicle on the road under true environmental conditions.

Cost is also a considerable factor when testing with absorption dynamometers since basic unit costs start at many thousands of dollars. Additionally, they often require support systems such as a test cell, a control console, a large water supply, an exhaust system, a large air circulation system, and other items. The use of the absorption dynamometer is generally limited to the automotive professional or the serious auto racer because of this expense factor.

Another method by which the horsepower of the prime mover may be determined is to employ a torque sensor means in the vehicle itself. This sensor can be of the type that is installed in series with the drive train of the vehicle or it may take on the form of a sensor that detects the rotation of the prime mover against its mount. The torque and rpm are measured and the horsepower is calculated in the same manner as that of the absorption dynamometer (a). This method does not require support systems and has the advantage of being able to determine prime mover horsepower while driving the vehicle on the road under true environmental conditions. The disadvantage is that a torque sensor with any degree of accuracy is generally very expensive and difficult to implement.

A significant shortcoming of both the absorption dynamometer method and the in-vehicle torque sensor method is the fact that they determine the output horsepower of the prime mover only. They are not capable of measuring the horsepower dissipated by the vehicle due to such dynamic vehicular characteristics as:

Aerodynamic drag due to air resistance.

Frictional drag due to tire deformation and the moving parts of the vehicle.

Viscous drag due to the working of the tires and the lubricants of the vehicle.

The amount of horsepower lost to drag can become quite large with some vehicles, even at relatively low speeds. High amounts of drag due to friction may indicate a vehicular malfunction. Excessive drag causes a proportionate loss of fuel economy. Aerodynamic drag becomes a major factor limiting the top speed of a racing vehicle. Because of these facts, the knowledge of the amount of horsepower lost to drag is of great importance to all facets of the automotive and transportation industry.

The basic laws of physics suggest that there is yet another method of determining the horsepower of the prime mover or the drag characteristics of a moving vehicle. From these laws, it can be shown that the horsepower required to accelerate a vehicle may be defined by the equation:

$$\text{Horsepower} = mavK \qquad (b)$$

where:
  m = The total mass (w/g) of the vehicle
  a = The instantaneous acceleration of the vehicle
  v = The instantaneous velocity of the vehicle
  K = A constant determined by the definition of horsepower In the above equation (b), the vehicle must be accelerating to obtain an indication of horsepower. The vehicle is also assumed to be perfect, with zero loss of horsepower due to vehicular drag. If a real world vehicle were to travel at a constant speed, the acceleration being neither positive or negative, the formula (b) would yield the incorrect (due to vehicular drag) answer that zero horsepower is required to maintain speed. Under accelerating conditions, the indication would be that of "Net" horsepower; i/e: the horsepower in excess of all other horsepower dissipated by vehicular drag. Therefore the above method and equation (b) may not be used directly to determine the "Gross" horsepower of the prime mover of a vehicle. Under real world conditions the equation (b) must be redefined to state:

$$\text{Net Horsepower} = mavK \quad (c)$$

By again rewriting the equation (b), a formula is produced that allows for the determination of the actual horsepower lost due to vehicular drag, thus:

$$\text{Drag Horsepower} = ma'vK \quad (d)$$

where:
$a'$ = The absolute value of the instantaneous acceleration of the vehicle while coasting in neutral.

The Gross horsepower delivered by the prime mover to the drive train in a moving vehicle is the algebraic sum of the net horsepower and the Drag horsepower. Therefore, by combining the above equations (c) and (d), the Gross horsepower of the prime mover may be defined by the equation, $$\text{Gross Horsepower} = m(a + a')vK \quad (e)$$

The preceding methods and equations work well in principle but they have not received wide spread acceptance in the past because of difficulties in the simultaneous measurement and multiplication of the instantaneous values of acceleration and velocity.

Additionally, the concept of continuous Gross horsepower measurement has been and is further complicated by the need for a means of determining the value of coasting acceleration at any given velocity while simultaneously adding this coasting acceleration value into the Gross horsepower equation (e) during the measurement process.

With the maturation of the semiconductor industry, it has been recognized that the problems of simultaneous measurement and multiplication could be overcome with solid-state electronic techniques. Apparatuses have been developed which include a means of determining acceleration, a means of determining velocity, a means whereby acceleration and velocity could be multiplied by each other and an indicating means. The operation of these instruments depends on the previously described laws of physics and relies exclusively on the calculation process expressed by the basic equation (b), Horsepower $= mavK$. The vehicular mass [m] and the constant [K] are generally considered as fixed values and are factored into the overall system gain of these apparatuses. Although these instruments are conceivably capable of measuring Net horsepower, Drag horsepower, Net torque, acceleration and velocity, they often suffer from one or more of the following imperfections:

The apparatus is capable of indicating horsepower under conditions of acceleration only.

The multiplier means is not fully bilateral nor truly linear, since a bipolar transistor was employed in this portion of the circuitry. This type of transistor conducts poorly in the reverse direction and is subject to an offset voltage because of its saturation characteristics. As a result, the accuracy of the instrument is degraded while measuring Drag horsepower and low levels of Net or Drag horsepower.

The apparatus will not accurately measure horsepower or acceleration on anything other than an absolutely level roadway surface since an inertial type accelerometer is not used to determine acceleration. Instead, the acceleration is derived from the velocity of the vehicle and the apparatus is not sensitive to the actual force propelling the vehicle.

The techniques employed to compensate for changes in angle of attack of the accelerometer do not provide accurate error correction for all grades of roadway. (Note: Angle of attack refers to the acute angle between the sensitive axis of the accelerometer and a line parallel to the roadway surface.)

The indicator does not read in actual horsepower units as a convenient means is not provided to calibrate the instrument with respect to vehicle mass.

None of the prior art apparatuses, including prior developmental units of the subject invention, were capable of implementing the calculation process expressed by the equation (e): Gross horsepower $= m(a + a')vK$. Therefore the above attempts by those skilled in the art were not successful in producing a method or apparatus that would conveniently or continuously measure the Gross horsepower produced by the prime mover and delivered to the drive train in a moving vehicle.

The most pertinent known prior art comprises six U.S. patents, a magazine article and several developments made by the inventor in the process of conceiving the subject invention. The U.S. patents are:

U.S. Pat. No. 2,318,645, May 11, 1943, "Horsepower Meter", C. D. Waldron

U.S. Pat. No. 3,494,204, Feb. 10, 1970, "Accelerometer Producing A Linear Electrical Output", H. S. Whitehead U.S. Pat. No. 3,581,561, June 1, 1971, "Engine Acceleration Horsepower-Metering System", Tomoshek et al U.S. Pat. No. 3,693,426, Sept. 26, 1972, "Portable Useful Horsepower Measuring Instrument", D. R. Little U.S. Pat. No. 3,729,989, May 1, 1973, "Horsepower and Torque Measuring Instrument", D. R. Little U.S. Pat. No. 3,583,002, Dec. 10, 1974, "Vehicular Performance Analyzer", G. H. Peck The magazine article, published in Hot Rod Magazine in 1974, was titled Driveable Dyno.

The prior art produced by the subject inventor comprises sketches, notes, equations, etc., recorded on drawings and in inventions, concepts, notebooks, workbooks, and laboratory notebooks. The following is a list of the concepts most pertinent to the eventual conception of the subject invention.

Non-Servo Linear Accelerometer; H. G. Middleton; Dec. 10, 1962

Applied Ground Horsepower Formula; H. Middleton; Oct. 21, 1965

Thrustometer; H. G. Middleton; Feb. 9, 1967

Inertial Dynamometer; H. G. Middleton; June 29, 1980

Gain v/s Freq; H. G. Middleton; July 15, 1980

Inertial Dynamometer; H. G. Middleton; July 21, 1980

Inertial Dynamometer; Riv. 8-7; H. G. Middleton; Aug. 7, 1980

Inertial Dynamometer; H. G. Middleton; Oct. 10, 1982

In view of the cited shortcomings of and difficulties with the prior art, it is specifically the primary object of this invention to provide a small, lightweight, inexpensive, convenient to use, accurate, multimode instrument that will determine, on any roadway grade, the performance characteristics of the prime mover in a moving vehicle and the dynamic vehicular characteristics of said moving vehicle.

Another object of this invention is to provide improvements over prior methods and apparatuses for the measurement of prime mover horsepower and torque in a moving vehicle and the drag characteristics of a moving vehicle.

Still another object of this invention is to provide a method and apparatus, having a convenient means for the calibration of the instrument with respect to vehicle mass therein, for the determination of the prime mover performance characteristics in a moving vehicle and the dynamic vehicular characteristics of said moving vehicle.

And still another object of this invention is to provide a method and apparatus whereby, at any given velocity, the value of the coasting acceleration of the moving vehicle may be determined and retained by circuitry within said apparatus. This retained value of coasting acceleration may then be used to compute the value of coasting acceleration at any given velocity as part of the calculation process during the determination of any vehicular parameter requiring the knowledge of the value of coasting acceleration during the measurement process.

Yet another object of this invention is to provide a method and an apparatus whereby the following vehicular parameters may be instantaneously measured and indicated while operating in a moving vehicle:
Gross prime mover horsepower
Net prime mover horsepower
Gross prime mover torque
Net prime mover torque
Gross acceleration (+ or −)
Net acceleration (+ or −)
Vehicular velocity
Gross force propelling the vehicle
Net force propelling the vehicle
Horsepower dissipated by aerodynamic drag
Horsepower dissipated by frictional drag (optional)
Horsepower dissipated by viscous drag (optional)
Total horsepower dissipated by the combined effects of aerodynamic, frictional and viscous drag
Frictional horsepower of the prime mover or drive train components
Horsepower dissipated by the brakes of the vehicle
Aerodynamic resistance to vehicular motion
Frictional resistance to vehicular motion (optional)
Viscous resistance to vehicular motion (optional)
Total resistance to vehicular motion due to the combined effects of aerodynamic, frictional and viscous drag
Resistance to vehicular motion due to braking of the vehicle
The coefficients of aerodynamic, frictional or viscous drag (optional)

And yet another object of this invention is to provide a method and apparatus whereby the lateral acceleration and lateral force may be determined during turning maneuvers.

A further object of this invention is to provide a method and apparatus whereby the degree of incline of a roadway grade may be determined.

Yet a further object of this invention is to provide a method and apparatus whereby the prime mover horsepower and the dynamic vehicular characteristics of a moving vehicle may be permanently recorded.

And yet a further object of this invention is to provide an improved method whereby compensation may be made for changes in the angle of attack of the acceleration sensing device (accelerometer).

A significant object of this invention is to provide a method and apparatus whereby the instrument may act as a driving aid for the improvement of fuel economy and the early detection of vehicular malfunction.

A meaningful object of this invention is to provide a method and apparatus for the determination of the performance characteristics of the prime mover and drag characteristics of any type of moving conveyance, in or on any type of transporting medium.

These and other objects of the above described invention will become obvious to those skilled in the art from the following detailed description of the preferred embodiment of this invention in reference to the accompanying drawings.

In the attainment of the foregoing objects, the preferred embodiment of this invention "the Inertial Dynamometer" is a multimode instrument intended for the real-time determination of the prime mover performance characteristics in a moving vehicle and the dynamic vehicular characteristics of the moving vehicle. Specific equations, derived from the laws of physics, are utilized by the apparatus of this invention during the determination of these characteristics, thus

| | |
|---|---|
| Vehicular velocity $= vK''$ | (f) |
| Net vehicular acceleration (+ or −) $= aK''$ | (g) |
| SIN $\theta$ incline of roadway $= aK''$ | (g) |
| Lateral acceleration $= aK''$ | (g) |
| Gross vehicular acceleration (+ or −) $= (a+a')K''$ | (h) |
| Net force propelling the vehicle $= maK''$ | (i) |
| Lateral force $= maK''$ | (i) |
| Resistance to vehicular motion $= maK''$ | (i) |
| Gross force propelling the vehicle $= m(a+a')K''$ | (j) |
| Net prime mover torque $= maK''$ | (k) |
| Gross prime mover torque $= m(a+a')K'$ | (l) |
| Net prime mover horsepower $= mavK$ | (m) |
| Horsepower dissipated by vehicular drag $= mavK$ | (m) |
| Gross prime mover horsepower $= m(a+a')vK$ | (e) |
| Prime mover frictional horsepower $= m(a+a')vK$ | (e) | where:
v = The instantaneous velocity of the vehicle
a = The signed value of the instantaneous acceleration of the vehicle a' = The absolute value of the instantaneous acceleration of the vehicle while coasting in neutral m = A constant determined by the total mass of the vehicle K = A constant determined by the definition of horsepower K' = A constant determined by the drive ratio of the vehicle K" = A constant determined by the desired sensitivity of instrument The above equations (e thru m) are indicative of the modes of operation of the instrument and, as will be described, the apparatus of this invention measures, multiplies, adds and subtracts the variables a, a', v with the appropriate constants m, K, K', K" to resolve the individual equation for each mode of operation.

The subject invention, being a multimode apparatus and method for the measurement of the prime mover horsepower and the dynamic vehicular characteristics of a moving vehicle, retains the advantages of the previously discussed prior art and is not encumbered by the delineated disadvantages. The apparatus of this invention is called an "Inertial Dynamometer", since it utilizes an inertial accelerometer and relies on the inertia of the vehicle during the measurement process. As with the prior art, this instrument depends on the laws of physics to determine horsepower. Unlike the prior art, however, it employs the calculation process expressed by the equation (e): Gross horsepower = $m(a+a')vK$. The apparatus of this invention is similar to that of the prior art only in that it includes an acceleration determining means, a velocity determining means, a multiplier means and an indicating means. The acceleration and velocity determining means and the multiplier means of this invention provide substantial improvements over the prior art. The indicating means is that of any prior art. The apparatus also includes: a switch means whereby each mode of operation may be selected; a means whereby the mass of the vehicle may be factored into the calibration of the apparatus; a means whereby the output of the apparatus may be calibrated for all modes of operation; a means whereby the velocity determining means may be calibrated for any of various vehicles or types of velocity sensors; a means whereby the value of the coasting accelerator may be determined at any given velocity while simultaneously adding this value into the calculation process of the apparatus, and a means whereby effective compensation may be made for changes in angle of attack. In addition to horsepower, this apparatus is capable of measuring and indicating acceleration, force, resistance, torque, and velocity in a moving vehicle. With the vehicle at rest, the instrument may be used as an inclinometer to determine the roadway grade. If the accelerometer is positioned with the sensitive axis 90 degrees to the direction of travel, the lateral acceleration and force may be determined. With the addition of optional circuitry to the basic apparatus, the coefficients of friction, viscous, and aerodynamic drag may also be determined.

DETAILED DESCRIPTION OF THE INVENTION

To enable a comprehensive understanding of the apparatus and methods of this invention, the overall operation and interaction of the functional blocks are first described. Second, the individual functional blocks and their internal structure are detailed. Last, the operation of the apparatus and its method of use are described. Throughout the description, the primary mode of operation is that of Gross horsepower since it is the most complex and requires the full utilization of the functional blocks within the system. The calculation process of this mode is expressed by the equation Gross horsepower = $m(a+a')vK$. As the sequence of operation is followed, partial solutions to this equation or modified forms thereof become apparent and are identified by brackets [ ]. These partial implementations of the equation provide the necessary calculation processes for the less complex modes of operation of the instrument and are discussed as they become applicable.

Figure 1:
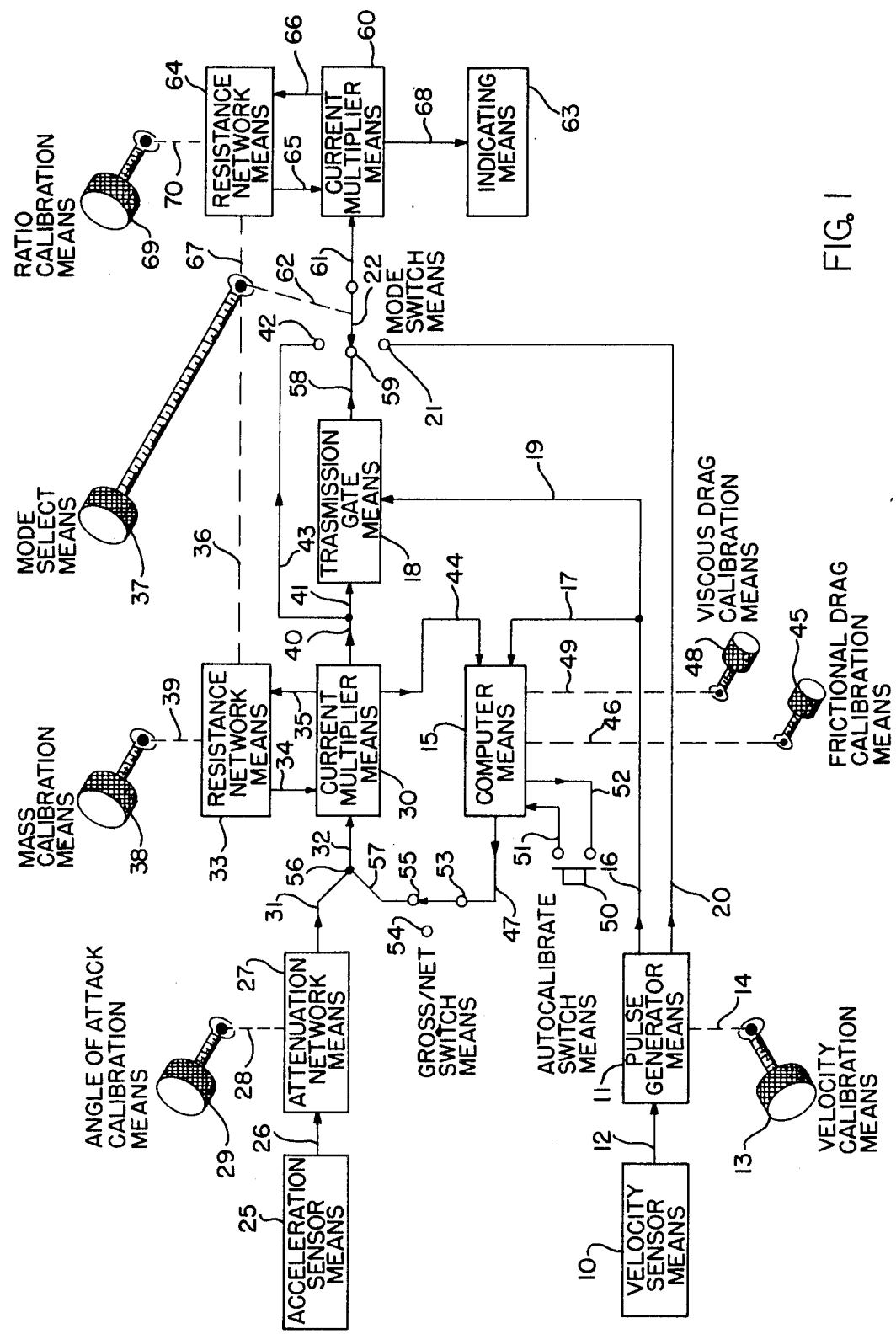
FIG. 1 illustrates the preferred embodiment of the apparatus of this invention in block diagram form.

Referring to the Systems Block Diagram FIG. 1, the operation of the apparatus of this invention begins with the simultaneous determination of vehicular velocity and acceleration. These variables are detected by a velocity sensor means 10 and an acceleration sensor means 25.

The commercial availability of a variety of vehicular velocity sensors negated the need to develop a special velocity sensor for the apparatus of this invention. These include, but are not limited to speedometer cable, drive line, wheel, fifth wheel and Doppler radar velocity sensors. The characteristic output of all of these sensors is an electrical waveform having repetition rate directly proportional to the velocity of the vehicle. The apparatus of this invention may use any of the above velocity sensors or any other vehicular velocity sensor with electrical output characteristics similar to the above. While it is possible to determine the velocity of the vehicle from the rotational speed (rpm) of the prime mover, the loss of accuracy due to the transmission of the vehicle makes this a less desirable configuration for the apparatus of this invention. For the purpose of this disclosure, the signal generator available from Beede Electrical Instrument Co., Inc. (#517526) will be used as the example for the velocity sensor means 10. This device is typically installed in series with the speedometer cable of the vehicle. The electrical output signal of the velocity sensor means 10 is conveyed to the input of the pulse generator means 11 via lead 12. The signal on lead 12 triggers the pulse generator means 11 to produce a pulse train that is in synchronization with the output of the pulse velocity sensor means 10. Each pulse of this pulse train is of constant duration and electrical height. Therefore, the average electrical value of the pulse train is directly proportional to the velocity of the vehicle [v]. As the rotational speed of the speedometer cable versus vehicular velocity may vary from vehicle to vehicle or different methods may be utilized to detect vehicular velocity, an "operator adjustable" velocity calibration means 13 is coupled by a link 14 to the pulse generator means 11 to facilitate alterations to the characteristics of the pulse train. This provides a means whereby the apparatus may be calibrated with respect to various vehicles and velocity sensors means 10. The pulse train output of the pulse generator means 11 is conveyed, in the form of electrical potential pulses, to the velocity input of the computer means 15 via leads 16 and 17 and the control input of the transmission gate means 18 by leads 16 and 19. The pulse train output is also conveyed, in the form of electrical current to a contact 21 of the mode switch means 22 via lead 20.

The acceleration sensor means 25 of the apparatus of this invention is a force-balance type accelerometer which may be an integral part of the apparatus itself or may be located at a remote site within the vehicle. Although a commercially available accelerometer could be used for this application, such as that of U.S. Pat. No. 3,494,204 or The Linear Servo Accelerometer, #4310, by Systron Donner, the accelerometer of the preferred embodiment of this invention is an improvement over the prior art and is described in detail in the Functional Blocks section of this disclosure. The acceleration sensor means 25 is sensitive to acceleration along one axis only and it is situated in the vehicle so that this sensitive axis is parallel to the roadway surface and in alignment with the direction of travel of the vehicle. The output of this acceleration sensor means 25, which appears on lead 26, is an electrical current, the value of which is directly proportional to the inertial acceleration of the vehicle. Since a certain portion of the output of the prime mover of the vehicle is dissipated by vehicular drag, the inertial acceleration of the vehicle is representative of the net acceleration [a] of the vehicle. It is well known that for any given output of the prime mover, the velocity with time rate of acceleration of a vehicle will be less while climbing a hill than it would be if the vehicle were accelerating on a level roadway surface.

This loss of acceleration while on a hill is due to the force of gravity tending to hold the vehicle back. On this same hill, however, the acceleration sensor means 25 will sense an additional acceleration component due to gravity. The algebraic sum of the acceleration rate of the vehicle and the acceleration component due to gravity remains directly proportional to the output of the prime mover. Therefore, for any given output of the prime mover, the output of the accelerometer will remain constant regardless of the incline of the roadway. Another way of examining this property of the apparatus is to note the formula from physics that states, $$\text{acceleration} = \text{Force/mass or } a = F/m \tag{n}$$

If the output of the prime mover remains constant, then the Force [F] propelling the vehicle will remain constant. If the mass [m] of the vehicle also remains constant, then it can be shown with above equation $a = F/m$ that the acceleration [a] of the vehicle as sensed by the subject invention will remain constant without regard to the roadway grade. Under conditions of acceleration, there may be a slight change in the angle of attack respect to the roadway surface, as most vehicles have a tendency to pitch up and back on their suspension systems while under acceleration. As a result, the output of the acceleration sensor means 25 may contain a second acceleration component due to the force of gravity. Extensive studies of vehicle dynamics at various race tracks and trucking firms have shown the angular displacement to be generally less than 2 degrees under 1 g of acceleration. This displacement constitutes an error in the output of the acceleration sensor means 25 of less than 3.5%. The second acceleration component due to the change in angle of attack bears a linear relationship to the inertial acceleration of the vehicle because of the basic characteristics of most vehicular suspensions systems. Therefore, the error percentage will remain nearly constant for all magnitudes of acceleration and roadway grades. As the error due to changes of angle of attack is relatively small and constant, it is only necessary to reduce the sensitivity of the apparatus slightly to bring the instrument back into calibration. For this purpose, an attenuation network means 27 is provided at the output of the acceleration sensor means 25 via lead 26. An "operator adjustable" angle of attack calibration means 29 is coupled to this attenuation network means 27 by a link 28 to provide a means whereby the apparatus may be calibrated with respect to the angle of attack of the vehicle. After proper calibration with respect to the change in angle of attack of the particular vehicle in which the apparatus is installed, the output of the attenuation network means will be an electrical current with value directly proportional to the "true" net acceleration [a] of the vehicle parallel to the roadway surface. Alternately, and without modifying the intent of this disclosure, the above attentuation network means 27, the link 28 and the angle of attack calibration means 29 may be located elsewhere within the circuitry of the apparatus of this invention, as long as they serve the purpose of desensitizing the apparatus as a means of compensation for changes in the angle of attack of the acceleration sensor means 25. Compensation may also be realized by desensitizing the acceleration sensor means 25 itself.

The output current from the attenuation network means 27 is passed on to the current multiplier means 30 via leads 31 and 32. This current multiplier means 30 serves to multiply the output current of the attenuation network means 27 by a preset amount.

This amount is established by the ohmic value of the resistance network means 33 which is connected to the current multiplier means 30 by leads 34 and 35. Since the apparatus of this invention is a multimode instrument, the current multiplier means 30 is required to operate in one of two configurations, either the acceleration configuration or the force configuration.

Each configuration requires a separate arrangement of resistive elements within the resistance network means 33. A switch internal to the resistance network means 33 block (not shown) is provided to select the appropriate resistive elements for each mode of operation of the instrument. This switch is coupled by a link 36 to the mode select means 37. This switching scheme is described in detail in the Functional Blocks section of this disclosure. When the mode of operation for the instrument is such that the current multiplier means 30 is required to operate in the acceleration configuration, the value of the appropriate resistive element within the resistance network means 33 is constant. In this acceleration configuration, the current multiplier means 30 multiplies the electrical current [a] from the output of the attenuation network means 27 by a fixed amount and provides an electrical output current with a value directly proportional to the net acceleration [a] of the vehicle. When the mode of operation requires the current multiplier means 30 to operate in the force configuration, the value of the proper resistive element within the resistance network means 33 is variable. For the purpose of the adjustment of this variable resistance, an "operator adjustable" mass calibration means 38 is coupled by a link 39 to the resistance network means 33. This mass calibration means 38 provides for calibration of the apparatus with respect to the mass [m] of the vehicle. After proper calibration with respect to the mass [m] of the particular vehicle in which the apparatus is installed, the current multiplier means 30 will multiply the electrical current [a] from the output of the attenuation network means 25 by an amount that is directly related to the mass [m] of the vehicle. Therefore, output of the current multiplier means 30, while in the force configuration, will be an electrical current having a value directly proportional to the mass [m] of the vehicle multiplied by the net acceleration [a] of the vehicle=[ma]. This product, [ma], is directly proportional to the net force [F] propelling the vehicle. The electrical current output of the current multiplier means 30 is connected to the input of the transmission gate means 18 via leads 40 and 41 and a contact 42 of the mode switch means 22 by leads 40 and 43. The current multiplier means 30 also provides an electrical output potential that is representative of acceleration of the vehicle while in either the acceleration or force configuration of operation. This output potential is connected to the autocalibrate input of the computer means 15 via lead 44.

In order for the apparatus of this invention to determine the "gross" value of any acceleration related vehicular parameter it is first necessary to determine the gross acceleration of the vehicle. This gross acceleration is equivalent to what the acceleration of the vehicle would be if there were no vehicular drag whatsoever dissipating a portion of the output of the prime mover of the vehicle. The gross acceleration is equal to the algebraic sum of the signed value of the instantaneous net acceleration [a] of the vehicle at any given velocity and the absolute value of what the instantaneous acceleration [a'] of the vehicle would be if the vehicle were coasting in neutral at the same given velocity. The signed value of the net acceleration [a] of the vehicle while coasting in neutral is negative and is the result of all the vehicular drag characteristics acting on the vehicle to dissipate the kinetic energy stored in the mass of the vehicle. These drag characteristics are the aerodynamic drag of the vehicle due to air resistance, the frictional drag due to tire deformation and moving parts of the vehicle and the viscous drag due to the working of the tires and the lubricants of the vehicle. The leading manufacturers in the automotive and transportation industry have established that these drag characteristics are highly predictable and have developed certain empirical formulas which define these drag characteristics. For example, The Aerodynamic Forces and Road Load Requirements section of the Chevrolet Power Service Manual illustrates this fact. With the formulas in the manual it may be shown that once the amount of drag on the vehicle has been determined at a given velocity, the amount of drag on the vehicle may be calculated for any other velocity within the operational range of the vehicle.

Accordingly, the computer means 15 has been provided to determine the value of the instantaneous acceleration of the vehicle while coasting in neutral at a given velocity and then to calculate the absolute value of the instantaneous acceleration [a'] of the vehicle while coasting in neutral at any test velocity within the operating rance of the vehicle while summing this value [a'] with the signed value of the instantaneous net acceleration of the vehicle during the process of determining gross acceleration, gross force, gross torque or gross horsepower. The calculation process of this computer means 15 is expressed by the following equation:

$$a' = Cf + (Cv \times v) + (Ca \times v^2) \quad (o)$$

where:
- a' = The absolute value of the instantaneous acceleration of the vehicle while coasting in neutral
- v = The instantaneous velocity of the vehicle
- Cf = A constant determined by the frictional drag of the vehicle
- Cv = A constant determined by the viscous drag of the vehicle
- Ca = A constant determined by the aerodynamic drag on the vehicle The constant [Cf] has been approximated by the automotive and transportation industry to be equivalent to "0.015" for most vehicles. Thus, an electrical current [If] whose value is representative of this constant [Cf] is established within the computer means 15. As the constant [Cf] may vary by a small amount from vehicle to vehicle, changes in the value of the electrical current [If] may be effected by an "operator adjustable" frictional drag calibration means 45 which is coupled by a link 46 to the computer means 15. After proper calibration with respect to the frictional drag characteristic of the particular vehicle in which the apparatus is installed, the electrical current [If], the value of which is directly proportional to the absolute value of the frictional drag characteristic of the vehicle [Cf], will appear at the output, lead 47, of the computer means 15.

The Vehicular drag resulting from the viscous drag characteristic of the vehicle is generally insignificant except when the vehicle is very heavy or traveling at very high velocities. The constant [Cv] has, however, been incorporated into the calculation process of the computer means 15 to accomodate these conditions. The constant [Cv] is considered by the industry to be approximately equivalent to "0.0001" for most light to medium duty vehicles at velocities below 200 MPH. Thus, the pulse train from the electrical potential output of the pulse generator means 11, which appears at the input of the computer means 15 via leads 16 and 17, is integrated by the computer means 15 to produce an electrical potential [Ev] with a value directly proportional to the velocity of the vehicle. This electrical potential [Ev] is then converted to an electrical current [Iv] by the computer means 15. The initial value of the electrical current [Iv] is directly related to the constant [Cv]. Therefore, the electrical current [Iv] is directly proportional to constant [Cv] multiplied by the velocity [v] of the vehicle [Cv×v]. For the purpose of the calibration of the apparatus with respect to the viscous drag characteristic of the vehicle, a viscous drag calibration means 48 is coupled by a link 49 to the computer means 15 to facilitate alterations in the initial value of the electrical current [Iv]. After proper calibration with respect to the viscous drag characteristics of the particular vehicle in which the apparatus is installed, the electrical current [Iv] will be summed with the electrical current [If] at the output, lead 47, of the computer means 15 to provide an electrical current [If+Iv] that is directly proportional to the absolute value of the combined effects of the frictional and viscous drag characteristics of the vehicle; [Cf+(Cv+v)].

The value of the constant [Ca] is governed by several variable. These variables are: the projected frontal area of the vehicle, the coefficient of aerodynamic drag of the vehicle, the mass of the vehicle and the air density. The air density remains relatively constant for most test conditions; however, the frontal area, coefficient of aerodynamic drag and mass will vary substantially from vehicle to vehicle. Therefore it is not possible to approximate a "universal" value for the constant [Ca] that is representative of the aerodynamic drag characteristics of all vehicles. As the effect of changes in air density are insignificant at the time of testing and the laws of physics state that the aerodynamic drag on a vehicle is directly proportional to the square of the velocity of the vehicle, it may demonstrated algebraically that where the frontal area, coefficient of aerodynamic drag and mass of the vehicle remain constant at the time of testing, the value of the constant [Ca] may be established once the value of the aerodynamic drag on the vehicle has been determined at given velocity. Due to the fact that the frontal area, coefficient of aerodynamic drag and mass of the particular vehicle in which the apparatus is installed are unlikely to change at the time of testing, the computer means 15 uses to its advantage the above principle to determine the value of the constant [Ca]. Thus, the previously described electrical potential [Ev], whose value is directly proportional to the velocity of the vehicle, is squared by the computer means 15 to produce an electrical potential [Evv] that is directly proportional to the square of the vehicular velocity [$v^2$]. The computer means 15 then converts the electrical potential [Evv] to an electrical current [Ivv] and multiplies the value of this electrical current [Ivv] by a constant [Ca] with a value, after calibration, representative of the aerodynamic drag characteristic of the vehicle under test. The product of this operation is an electrical current [Id] with a value directly proportional the constant [Ca] multiplied by the square of the velocity [$v^2$] of the vehicle; [Ca×$v^2$]. For the purpose of the calibration of the apparatus with respect to the aerodynamic drag characteristic of the vehicle, an autocalibrate switch means 50 is connected to the computer means 15 by the leads 51 and 52 to provide a means of activating an automatic "Ca" calibration procedure within the computer means. If the autocalibrate switch means 50 is closed when the vehicle is coasting in neutral, the computer means 15 will automatically adjust the value of the constant [Ca] until it is equivalent to the aerodynamic drag characteristic of the vehicle under test. This automatic "Ca" calibration function of the apparatus is a "closed loop" process that is discussed in greater detail subsequently. After proper calibration with respect to the aerodynamic drag characteristic of the particular vehicle in which the apparatus is installed, the electrical current [Id] is summed with the electrical currents [If] and [Iv] at the output, lead 47, of the computer means 15 to provide an electrical current [a'] that is directly proportional to the absolute value of the combined effects of the frictional, viscous and aerodynamic drag characteristics of the vehicle; [Cf+(Cv×v)+Ca×$v^2$)]. As the values of the constants [Cf], [Cv] and [Ca] remain fixed after calibration, the electrical output current [a'] of the computer means 15 will vary only as a function of vehicular velocity. The value of this electrical output current [a'] at any given velocity will be representative of the absolute value of the instantaneous acceleration of the vehicle while coasting in neutral at the same given velocity. This electrical output current [a'] of the computer means 15 is conveyed to the gross/net switch means 53 via lead 47.

When the gross/net switch means 53 is in the open position 54, the apparatus continues to operate in the manner that has been previously described. Therefore the value of the electrical output current of the current multiplier means 30 will, depending on the mode of operation, remain directly proportional to either the net acceleration [a] of the vehicle or the net force [ma] propelling the vehicle. When the gross/net switch means 53 is in the closed position 55, the electrical output current [a'] of the computer means 15 is passed on to a summing point 56 via lead 57. The electrical output [a] of the attenuation network means 27 is also connected to this summing point 56 by lead 31.

At this summing point 56, the electrical current [a] from the output of the attenuation network means 27 is summed with the electrical current [a'] from the output of the computer means 15. The sum of these two currents, [a] and [a'], appears at the input of the current multiplier means via lead 32.

Returning now to the description of the "closed loop" process of the automatic "Ca" calibration function of the apparatus, if the vehicle is allowed to coast in neutral the value of the electrical output current [a] of the attenuation network means 27 will be directly proportional to the combined effects of the frictional, viscous, and aerodynamic drag characteristics of the vehicle. When the apparatus has been properly calibrated with respect to these drag characteristics of the vehicle under test, the value of the electrical output current [a'] of the computer means 15 will be equal and opposite to the electrical output current [a] of the attenuation network means 27. These electrical currents [a] and [a'] will therefore cancel each other and the resultant electrical input current to the multiplier means 30 will be zero. Under this zero input condition, the electrical potential output, lead 44, of the current multiplier means 30 will also be zero. The lead 44 which connects the electrical potential output of the current multiplier means 30 to the autocalibrate input of the computer means 15 closes the loop of the automatic "Ca" calibration function of the apparatus. The calibration of the constants [Cf] and [Cv] (the values of which respectively represent the frictional and viscous drag characteristics of the vehicle) are of a "set and forget" nature and should not require recalibration after the initial calibration for the vehicle under test. However, under conditions of high winds or large changes in air density, it may become desirable to recalibrate the constant [Ca], the value of which represents the aerodynamic characteristic of the vehicle under test. This may be accomplished by the closure of the autocalibrate switch means 50 while the vehicle is coasting in neutral. As previously described, the activation of the automatic "Ca" calibrate function starts an automatic adjustment procedure for the value of the constant [Ca]. This process continues until the electrical output current [a'] of the computer means 15 is equal and opposite to the electrical output current [a] of the attenuation network means 27, thus bringing the value of the electrical potential appearing at the autocalibrate input, lead 44, of the computer means 15 to zero. This zero potential at the autocalibrate input of the computer means 15 signals the computer means 15 to terminate the automatic "Ca" calibration procedure and maintain the constant [Ca] at a value which represents the aerodynamic drag characteristic of the vehicle under test.

As previously stated, when the gross/net switch means 53 is in the closed position 55, the electrical output current [a] of the attenuation network means 27 is summed with the electrical output current [a'] of the computer means at the summing point 56. This provides an electrical input current to the multiplier means 30, via lead 32, that is directly proportional to the algebraic sum of the signed value of the instantaneous net acceleration of the vehicle and the absolute value of the instantaneous acceleration of the vehicle while coasting in neutral [a+a']. This electrical current at the input of the current multiplier means is directly proportional to the grooss acceleration of the vehicle. Therefore, with the gross/net switch means 53 in the closed position 55, the electrical output current, lead 40, of the current multiplier means 30 will be as follows: When the mode of operation of the instrument is such that the current multiplier means 30 is required to operate in the acceleration configuration, the output will be an electrical current with value directly proportional to the gross acceleration of the vehicle [a+a']. When the mode of operation requires the current multiplier means 30 to operate in the force configuration, the output will be an electrical current [m(a+a')] with value directly proportional to the mass [m] of the vehicle multiplied by the gross acceleration [a+a'] of the vehicle. This product [m(a+a')] is directly proportional to the gross force propelling the vehicle.

The next step in the sequence of operations of the apparatus of this invention is to multiply the force propelling the vehicle by the vehicular velocity, thus producing an electrical signal that is directly related to the horsepower of the prime mover of the vehicle in which the apparatus is installed. The transmission gate means 18 is provided for this purpose. This transmission gate means 18 is utilized only when the instrument is in the horsepower mode of operation. When the instrument is in the horsepower mode, the current multiplier means 30 is required to operate in the force configuration and the electrical output current of this means 30 will be representative of either the gross or net force propelling the vehicle, depending on the position of the gross/net switch means 53. The electrical output current of the current multiplier means 30 is made available to the input, lead 41, of the transmission gate means 18 via leads 40 and 41. This transmission gate means, being equivalent to a solid state relay, serves to pass or not pass to its output, lead 58, the electrical current that is available at its input. The pass/no pass (on-off) function of the transmission gate means 18 is controlled by the pulse train output of the pulse generator means 11. Each time a pulse from the electrical potential output, lead 16, of the pulse generator means 11 appears at the control input, lead 19, of the transmission gate means 18 via leads 16 and 19, the transmission gate means will turn on and pass, from its input to its output, the electrical output current of the current multiplier means 30 which has been made available at the input of the transmission gate means 18. The duration of the electrical current flow through the transmission gate means 18 will be the same as that of the duration of each pulse of the pulse train output of the pulse generator means 11. As the duration of each pulse of this pulse train is constant and the repetition rate of the pulse train is directly proportional to the velocity of the vehicle, the average value of the electrical current flow throught the transmission gate means will be directly proportional to the value of the electrical current output of the current multiplier means 30 multiplied by the velocity of the vehicle. Thus, when the gross/net switch means 53 is in the open position 54, the output of the transmission gate means will be an electrical current [mav] with an average value directly proportional to the net force [ma] propelling vehicle multiplied by the velocity [v] of the vehicle. This product [mav] is directly proportional to the net horsepower output of the prime mover of the vehicle under test. When the gross/net switch 53 is in the closed position 55, the output of the transmission gate means 18 will be an electrical current with an average value directly proportional to the gross force [m(a+a')v]. This product [m(a+a')v] is directly proportional to the gross horsepower output of the prime mover of the vehicle under test. The electrical current output of the transmission gate means is connected to a contact 59 of the mode switch means via lead 58.

For each mode of operation of the instrument, it is necessary to select and connect to the input of the current multiplier means 60 the appropriate electrical current from the outputs of the various functional blocks within the apparatus of this invention. The mode switch means 22 has been provided for this purpose. As previously described, the electrical current outputs of the pulse generator means 11, current multiplier means 30 and transmission gate means 18 are connected to their associated contacts of the mode switch means 22 as follows: the electrical current output of the pulse generator means 11 to the contact 21 via lead 20, the output of the current multiplier means 30 to the contact 42 via leads 40 and 43 and the output of the transmission gate means 18 to contact 59 via lead 58. The mode switch means serves to electrically connect the electrical current outputs of the pulse generator means 11, current multiplier means 30 or the transmission gate means 18 to the input of the current multiplier means 60 via lead 61. For the purpose of selecting the appropriate electrical connection for each mode of operation, the mode switch means 22 is coupled by a link 62 to the mode select means 37.

When the mode switch means 22 is in the following positions, the electrical output current of the appropriate functional block will be made available at the input of the current multiplier means 60 via lead 61, thus: in position 21, the electrical current will be that of the output of the pulse generator means 11; in position 59 the electrical current will be that of the output of the transmission gate means 18 and in position 42 the electrical current will be that of the output of the current multiplier means 30.

In order to provide the indicating means 63 of the apparatus of this invention with an electrical current with a full scale value appropriate for the span of the indicating means 63 for each mode of operation of the instrument, it is necessary to multiply the electrical current output of the mode switch means 22 by the constants [K], [K'] or [K"]. The current multiplier means 60 has been provided for this purpose. This current multiplier means serves to multiply the output of the mode switch means 22, which is made available to input of the current multiplier means 60 via lead 61, by a preset amount. This amount is established by the ohmic value of the resistance network means 64 which is connected to the current multiplier means 60 by leads 65 and 66. Depending on the mode of operation of the instrument, the current multiplier means 60 is required to operate in one of three configurations. These configurations are of sensitivity, horsepower or ratio. Each configuration requires a separate arrangement of resistive elements within the resistance network means 64. A switch internal to the resistance network means 64 block (not shown) is provided to select the appropriate resistive element for each mode of operation of the instrument. This switch is coupled by a link 67 to the mode select means 37. This switching scheme is delineated in the Functional Blocks section of this disclosure. In addition to the above multiplication function, the current multiplier means 60 serves to integrate the electrical current pulses which appear at its input when the instrument is in the velocity or horsepower modes. When the mode of operation of the instrument is such that the current multiplier means 60 is required to operate in the sensitivity configuration, the value of the appropriate resistive element within the resistance network means 64 is fixed at a value that is directly related to the constant [K"]. The value of the constant [K"] determines the initial full-scale sensitivity of the apparatus. In the sensitivity configuration, the current multiplier means 60 multiplies the electrical current output of the mode switch means 22 by a fixed amount to provide an electrical current at the output, lead 68, of the current multiplier means 60 that is directly proportional to the average value of the electrical output current of the mode switch means 22 multiplied by the constant [K"]. Similarly, when the mode of operation requires the current multiplier means 60 to operate in the horsepower configuration, the value of the appropriate resistive element within the resistance network means 64 is fixed at value that is directly related to the constant [K]. The value of the constant [K] is determined by the initial full-scale sensitivity of the apparatus and the definition of horsepower. In the horsepower configuration, the output of the current multiplier means 60 will be an electrical current with a value directly proportional to the average value of the electrical output current of the mode switch means 22 multiplied by the constant [K]. When the mode of operation requires the current multiplier means 60 to operate in the ratio configuration, the appropriate resistive element within the resistance net work means 64 is variable and the value of this variable resistive element is directly related to the constant [K']. The value of the constant [K'] is determined by the initial full-scale sensitivity of the apparatus and the reciprocal of the value of the drive ratio of the vehicle. The value of this drive ratio is equivalent to the gear ratio between the prime mover and the drive axle of the vehicle divided by the radius of the drive wheels of the vehicle. For the purpose of the adjustment of the variable resistive element within the resistance network means 64, a ratio calibration means 69 is coupled by a link 70 to the resistance network means 64 to provide a means whereby the value of the constant [K'] may be calibrated with respect to the drive ratio of the vehicle.

After proper calibration with respect to drive ratio of the vehicle the output of the current multiplier means 60 will be an electrical current with a value directly proportional to the value of the electrical output current of the mode switch means 22 multiplied by the constant [K']. As the value of the constant [K'] is directly related to the reciprocal of the drive ratio of the vehicle, the value of the electrical output current of the current multiplier means 60, while in the ratio configuration, will be directly proportional to the value of the electrical output current of the mode switch means 22 multiplied by the reciprocal of the drive ratio of the vehicle. In all three configurations, sensitivity, horsepower or ratio, the electrical output current of the current multiplier means 60 is conveyed to the indicating means via lead 68.

As previously described, the mode select means 37 is coupled to the resistance network means 33 by link 36, the mode switch means 22 by link 62 and the resistance network means 63 by link 67. This mode select means 37 is the means whereby the operational configurations of both of the current multiplier means 30 and 60 and the appropriate position of the mode switch means 22 may be selected for each mode of operation of the apparatus of this invention. When the instrument is operating in the following modes, the operational conditions of the apparatus will be as indicated:

Velocity: While in this mode of operation, neither the configuration of the current multiplier means 30 or the position of the gross/net switch means 53 is applicable. The current multiplier means 60 will be in the sensitivity configuration. The mode switch means 22 will be in position 21 and the input to the current multiplier means 60 will be an electrical current [v] with a value directly proportional to the velocity of the vehicle. The output of the current multiplier means 60 will be an electrical current [vK"] with a value directly proportional to the velocity of the vehicle [v] multiplied by the constant [K"]. The value of the electrical current [vk"] will be representative of the velocity of the vehicle.

Net Acceleration: The current multiplier means 30 will be in the acceleration configuration. The current multipler means 60 will be in the sensitivity configuration. The gross/net switch means 53 will be in the open position 54. The mode switch means 22 will be in position 42 and the input to the current multiplier means 60 will be an electrical current [a] with a value directly proportional to the net acceleration of the vehicle. The output of the current multiplier means 60 will be an electrical current [aK"] with a value directly proportional to the net acceleration of the vehicle [a] multiplied by the constant [K"]. The value of the electrical current [aK"] will be representative of the net acceleration of the vehicle.

SIN θ: When operating in this mode, the operational conditions of the apparatus are identical to those of the Net Acceleration mode with the exception that the vehicle is stationary rather than moving along the roadway surface. With the vehicle at rest and the drive wheels locked, the value of the electrical output current [aK"] of the current multiplier means 60 will be representative of the Sine of the acute angle between the line of vehicular travel parallel to the roadway surface and a line parallel to the mean surface of the Earth at the site of the vehicle.

Lateral Acceleration: While in this mode of operation, the operating conditions of the apparatus are identical to those of the Net Acceleration mode with the exception of the realignment of the sensitive axis of the acceleration sensor means 25. With the sensitive axis of the acceleration sensor means 25 positioned such that it is parallel to the roadway surface and 90 degrees to the direction of vehicular travel, the value of the electrical output current [aK″] of the current multiplier means 60 will be representative of the lateral acceleration of the vehicle.

Gross Acceleration: The current multiplier means 30 will be in the acceleration configuration. The current multiplier means 60 will be in the sensitivity configuration. The gross/net switch means 53 will be in the closed position 55. The mode switch means 22 will be in position 42 and the input to the current multiplier means 60 will be an electrical current [a+a'] with a value directly proportional to the gross acceleration of the vehicle. The output of the current multiplier means 60 will be an electrical current [(a+a')K″] with a value directly proportional to the gross acceleration of the vehicle [a+a'] multiplied by the constant [K″]. The value of the electrical current [(a+a')K″] will be representative of the gross acceleration of the vehicle.

Net Force: The current multiplier means 30 will be in the force configuration. The current multiplier means 60 will be in the sensitivity configuration. The gross/net switch means 53 will be in the open position 54. The mode switch means 22 will be in position 42 and the input to the current multiplier means 60 will be an electrical current [ma] with a value directly proportional to the net force propelling the vehicle. The output of the current multiplier means 60 will be an electrical current [maK″] with a value directly proportional to the net force propelling the vehicle [ma] multiplied by the constant [K″]. The value of the electrical current [maK″] will be representative of the net force propelling the vehicle.

Lateral Force: While in this mode of operation, the operating conditions of the apparatus are identical to that of the Net Force mode with the exception of the realignment of the sensitive axis of the acceleration sensor means 25. With the sensitive axis of the acceleration sensor means 25 positioned such that it is parallel to the roadway surface and 90 degrees to the direction of vehicular travel, the value of the electrical output current [maK″] of the current multiplier means 60 will be representative of the lateral force of the vehicle.

Resistance: The operating conditions of the apparatus while operating in this mode are identical to those of the Net Force mode except that the term "Resistance" is utilized during the determination of the negative forces attempting to retard vehicular motion. The value of the electrical output current [maK″] will be representative of the resistance to vehicular motion.

Gross Force: The current multiplier means 30 will be in the force configuration. The current multiplier means 60 will be in the sensitivity configuration. The gross/net switch means 53 will be in the closed position 55. The mode switch means 22 will be in position 42 and the input to the current multiplier means 60 will be an electrical current [m(a+a')] with a value directly proportional to the gross force propelling the vehicle. The output of the current multiplier means 60 will be an electrical current [m(a+a')K″] with a value directly proportional to the gross force propelling the vehicle [m(a+a')K″] multiplied by the constant [K″]. The value of the electrical current [m(a+a')K″] will be representative of the gross force propelling the vehicle.

Net Torque: The current multiplier means 30 will be in the force configuration. The current multiplier means 60 will be in the ratio configuration. The gross/net switch means 53 will be in the open position 54. The mode switch means 22 will be in position 42 and the input to the current multiplier means 60 will be an electrical current [ma] with a value directly proportional to the net force propelling the vehicle. The output of the current multiplier means 60 will be an electrical current [mak'] with a value directly proportional to the net force propelling the vehicle [ma] multiplied by the constant [K']. As the value of the constant [K'] is directly related to the reciprocal of the multiplication ratio of the prime mover torque affected by the drive ratio between the prime mover and roadway surface, the value of the electrical current [mak'] will be representative of the net torque of the prime mover of the vehicle.

Gross Torque: The current multiplier means 30 will be in the force configuration. The current multiplier means 60 will be in the ratio configuration. The gross/net switch means 53 will be in the closed position 55. The mode switch means 22 will be in position 42 and the input to the current multiplier means 60 will be an electrical current [m(a+a')] with a value directly proportional to the gross force propelling the vehicle. The output of the current multiplier means 60 will be an electrical current [m(a+a')K'] with a value directly proportional to the gross force propelling the vehicle [m(a+a')K'] multiplied by the constant [K']. The value of the constant [K'] is directly related to the reciprocal of the multiplication ratio of the prime mover torque affected by the drive ratio between the prime mover and the roadway surface. Thus the value of the electrical current [m(a+a')K'] will be representative of the gross torque of the prime mover of the vehicle.

Net Horsepower: The current multiplier means 30 will be in the force configuration. The current multiplier means 60 will be in the horsepower configuration. The gross/net switch means 53 will be in the open position 54. The mode switch means 22 will be in position 59, and the input to the current multiplier means 60 will be an electrical current [mav] with a value directly proportional to the net horsepower of the prime mover of the vehicle. The output of the current multiplier meams 60 will be an electrical current [mavK] with a value directly proportional to the net horsepower of the prim e mover of the vehicle [mav] multiplied by the constant [K]. The value of the electrical current [mavK] will be representative of the net horsepower of the prime mover of the vehicle.

Drag Horsepower: The operating conditions of the apparatus while operating in this mode are identical to those of the Net Horsepower mode except the term "Drag Horsepower" is utilized during the determination of the horsepower lost to vehicular drag. The value of the electrical output current [mavK] will be representative of the horsepower dissipated by the drag characteristics of the vehicle.

Gross horsepower: The current multiplier means 30 will be in the force configuration. The current multiplier means 60 will be in the horsepower configuration. The gross/net switch means 53 will be in the closed position 55. The mode switch means 22 will be in position 59, and the input to the current multiplier means 60 will be an electrical current [m(a+a')v] with a value directly proportional to the gross horsepower of the prime mover of the vehicle. The output of the current multiplier means 60 will be an electrical current [m(a+a')vK] with a value directly proportional to the gross horsepower of the prime mover of the vehicle [m(a+a')v] multiplied by the constant [K]. The value of the electrical current [m(a+a')vK] will be representative of the gross horsepower of the prime mover of the vehicle.

Frictional Horsepower: The operating conditions of the apparatus while operating in this mode are identical to those of the Gross Horsepower mode except the term "Frictional Horsepower" is utilized during the determination of the horsepower lost to the friction of the prime mover. The value of the electrical output current [m(a+a')vK] will be representative of the horsepower dissipated by the frictional characteristics of the prime mover of the vehicle.

As the electrical output current of the current multiplier means 60 is conveyed to the indicating means 63 via lead 68, and the full scale output current of the apparatus is determined by the values of the constants [K], [K'] or [K"], the indicating means 63 will be provided with an electrical current with a full scale value appropriate for the span of the indicating means 63 in each of the above modes of operation. The indicating means will therefore display the output of the apparatus of this invention in the appropriate units of measure for each mode of operation.

The indicating means 63 of the apparatus of this invention is a current sensitive indicating device which serves the purpose of providing a visual presentation of the value of the electrical output current of the apparatus during the determination of any of the vehicular parameters that the apparatus is intended to measure. The commercial availability of a variety of current monitoring devices has made it unnecessary to develop a special indicating means 63 for the apparatus of this invention. These include, but are not limited to: moving-coil, (D'Arsonval), moving-magnet, moving-iron, segmented bar-graph and digital type current meters. The D'Arsonval type current meter, such as the Beede Indicator Model 3-03-8, 250° movement, is utilized as the example for the indicating means 63 of the preferred embodiment of this invention. This meter movement may be replaced with any of the above current meters or any other type of current monitoring device so long as it serves the purpose of providing a means of monitoring the electrical output current of the apparatus while operating in any of the previously described modes of operation.

The indicating means 63 may be replaced or operated in conjunction with a current sensitive recorder to provide a means whereby the electrical output current of the apparatus of this invention may be permanently recorded during the determination by the apparatus of the prime mover performance characteristics or the dynamic vehicular characteristics of the vehicle under test. This recorder may be that of any prior art, such as:

MFE MODEL 4153

The following alterations of the apparatus are within the scope of this invention.

Any mode of operation may be deleted.

The mode switch means 22, current multiplier means 60, resistance network means 64 and ratio calibration means 69 may be deleted and an indicating means of the proper calibration may be connected instead to the electrical current output of the desired function block for each mode of operation.

Although mechanical type switching is implied for the mode switch means 22, gross/net switch means 53 and the configuration switches within both of the resistance network means 30 and 60, these may be replaced with electronic switching which is controlled by electronic logic that is under the control of the mode select means 37.

The velocity calibration means 13, angle of attack calibration means 29, mass calibration means 38, ratio calibration means 69 and their associated variable elements may be relocated elsewhere within the circuitry of the apparatus of this invention so long as they serve their intended purpose as described in the text of this disclosure.

Additional circuitry and switching may be added to the preferred embodiment of the apparatus of this invention to provide a means whereby the horsepower dissipated by, the resistance to vehicular motion due to, or the coefficients of the frictional, viscous, or aerodynamic drag characteristics of the vehicle under test may be determined by the apparatus.

Given the appropriate analog to digital and digital to analog converters, the electrical circuitry within the apparatus of the preferred embodiment of the apparatus of this invention may be replaced in whole or part by a digital computer. This digital computer may be, but is not limited to, a microcomputer or microcontroller with or without on-board analog to digital and digital to analog converters.

The above is a complete description of the overall apparatus of this invention and its operation. This description is supplemented and enhanced by the following descriptions of each of the functional blocks of the apparatus and a following description of the methods of use. In the descriptions various components are labeled by letter/number combinations, such as IC11, LED20, etc. The significance of these labels is given in the following table.

ACTIVE COMPONENTS

Integrated circuit semiconductor devices

IC11 (A&B): LM393, Low Offset Voltage Dual Comparator
IC12 (A&B): CD4046, Phase-Locked Loop (CMOS)
IC13 (A&B): CD4018, Presettable Divide-By-"N" Counter (CMOS)
IC14: ICM7555, Timer (CMOS)
IC21: LF351, Operational Amplifier (JFET Input)
IC31 (A&B): LF412, Low Offset Voltage Dual Operational Amplifier (JFET Input)
IC32 (A&B): DG212, Quad SPST Analog Switch (CMOS)
IC51 (A,B,C&D): CD4001, Quad 2-Input Nor Gate (CMOS)
IC52: CD4040, Binary Ripple Counter (CMOS)
IC53: DAC0808, 8-Bit D/A Converter
IC54 (A&B): LF353, Dual Operational Amplifier (JFET Input)

Discrete Semiconductor Devices

LED21: H23A1, Light Emitting Diode (½ Matched Emitter-Detector Pair)
Q21: H23A1, Phototransistor (½ Matched Emitter-Detector Pair)

Electro-Mechanical Devices

S22 (A,B&C): 3 Pole, 5 position ganged switch
50: SPST, Momentary Push Button Switch
53: SPDT Switch
R18: Single Turn Potentiometer
R32: Single Turn Potentiometer R35: Decade Rheostat with Calibrated Readout
R36: Decade Rheostat with Calibrated Readout
R62: Single Turn Potentiometer
R63: Single Turn Potentiometer
TQ21: MP4, "D'Arsonval", Taut-Band, Meter Movement (Modutec Inc.)
10: #517526 Signal Generator (Beede Electrical Instrument Co., Inc.)
63: Model 1105, 5-inch, "D'Arsonval" meter (Faria Meter Corp.)

Velocity Sensor Means 10

Any vehicular velocity sensing device with the following electrical output characteristics may be utilized as the velocity sensor means (10) for the apparatus of this invention:

Waveform: Sine, Square, Triangle, Sawtooth or Pulse
Frequency: 1 to 100 Hertz per mile per hour
Amplitude: 100 millivolts to 5 volts, peak to peak Velocity sensing devices are commercially available, such as, for example, the Beede #517526 Speed Sensor or the #MA86656 Series Doppler Transceivers by M/A Com GAAS Products, Inc., Burlington, Mass.

Pulse Generator Means 11

Figure 2:
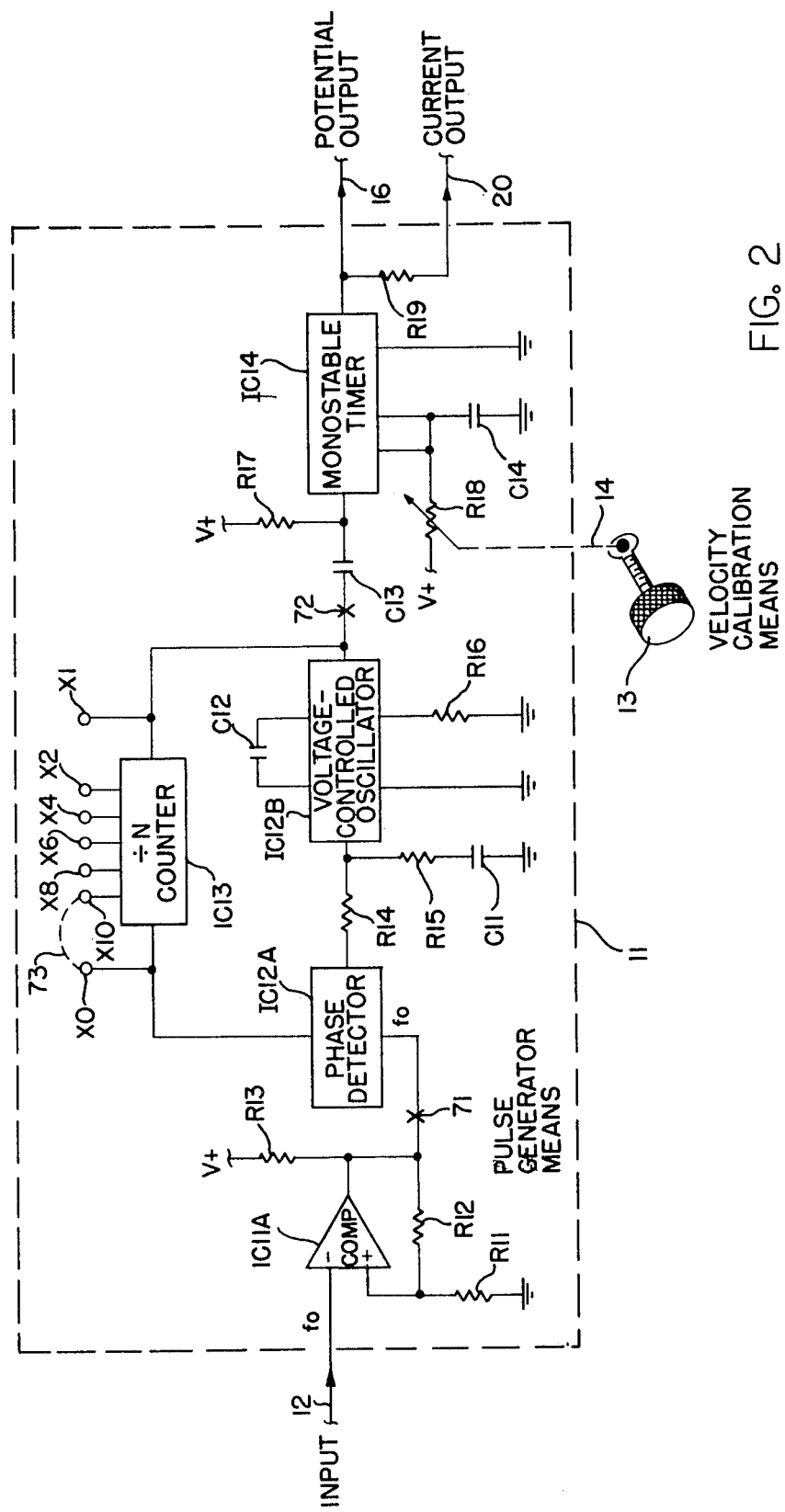
FIG. 2 is a schematic diagram of the pulse generator means 11 and velocity calibration means 13.

Referring to FIG. 2; the comparator IC11A acts as a Schmitt trigger to condition the signal which appears on the input lead 12 of the pulse generator means 11, thus providing a fast rise time signal to the input of the phase-locked loop circuit that is formed by the phase-locked loop IC12 A&B and the counter IC13. The output of this phase-locked loop circuit provides a trigger signal for the monostable timer IC14 at a frequency that is equal to the input frequency, lead 12, multiplied by the divide ratio of the counter IC13. This frequency multiplication circuit is provided for the purpose of improving the response time of the apparatus. As there may be a wide variation in output frequencies from the different types of velocity sensors that may be utilized by the apparatus of this invention, the multiplication ratio of the phase-locked loop may be programmed to an appropriate value for the particular velocity sensor in use by the installation of the jumper 73 between the terminal X0 and the terminals X1, X2, X4, X6, X8 or X10. The monostable timer IC14, being triggered by the output of the phase-locked loop, IC12 A&B and IC13, produces a pulse train at a frequency that is equal to the signal on the input, lead 12, of the pulse generator means 11 multiplied by multiplication ratio of the phase-locked loop. Each pulse of this pulse train is of constant width and amplitude. The pulse train appears at the potential output lead 16 of the pulse generator means 11 as electrical potential pulses. The pulse train is also made available, as electrical current pulses, at the current output lead 20 of the pulse generator means 11. The duration of each pulse of the pulse train may be modified by the adjustment of the potentiometer R18. For this purpose, the potentiometer R18 is coupled by any prior art means 14 to a knob. This knob is the velocity calibration means 13.

Under conditions where very fast response times are not required of the apparatus of this invention, the phase-locked loop circuit may be deleted from the pulse generator means 11 by removing the integrated circuits IC12 A&B and IC13 with their associated circuitry and connecting the points 71 and 72 together.

Acceleration Sensor Means 25

Figure 3:
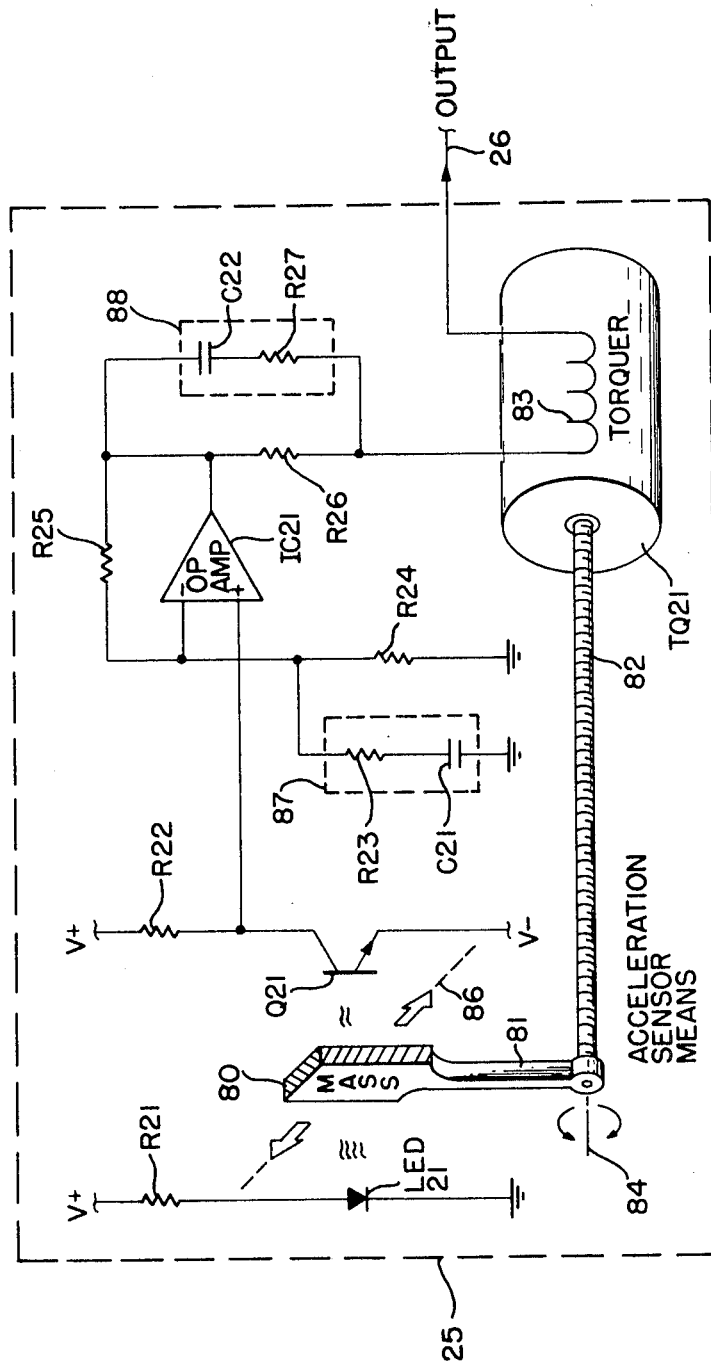
FIG. 3 depicts the acceleration sensor means 25 in schematic form.
Figure 4:
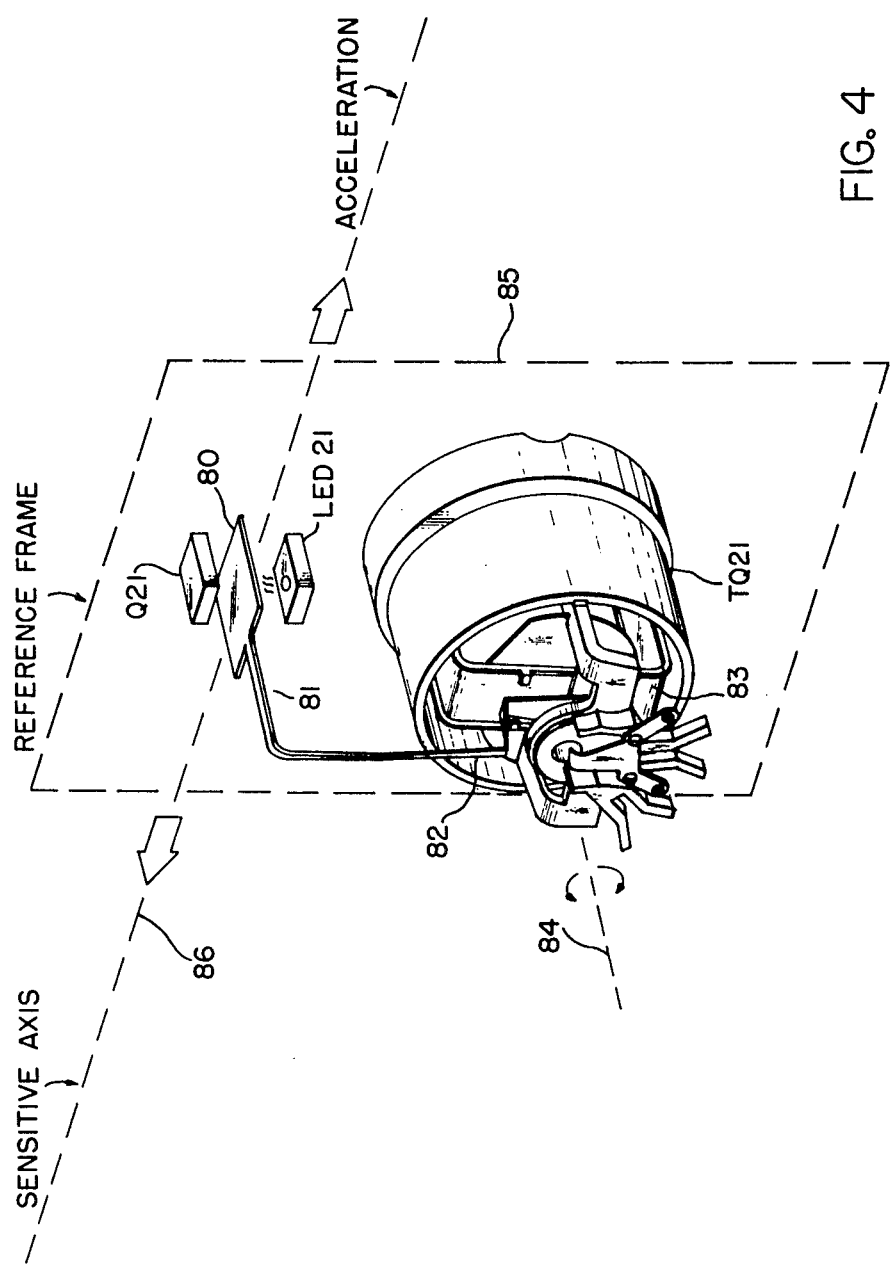
FIG. 4 illustrates the electro-mechanical arrangement of the acceleration sensor means 25.

Referring to FIGS. 3 and 4, the acceleration sensor means 25 of the apparatus of this invention may be classified as a pendulous, force-balance accelerometer. A description of this type of accelerometer may be found in the text of the "Control Engineers Handbook" by John G. Truxal, published in 1958 by the McGraw-Hill Book Co., Inc. or the article titled "Accelerometer Fundamentals—Part 1" by Albert Alden, published on Nov. 1, 1963 by the Systron-Donner Corporation. The U.S. Pat. No. 3,494,204 (Feb. 10, 1970) by Harold S. Whitehead also describes an accelerometer of this class. The accelerometer of the acceleration sensor means 25 of the apparatus of this invention is similar to that of the prior art in that it includes a D'Arsonval type torquer mechanism TQ21; a pendulous mass 80 and 81 which is attached to the armature 83 of the torquer mechanism TQ21 and is free to pivot about (1) the rotational axis 84 of the armature 83 of the torquer mechanism TQ21, (2) a position detector LED21 and Q21 to detect the physical position of the mass 80 with respect to the reference frame 85 of the accelerometer and (3) an error amplifier IC21 which amplifies the error signal from the output of the position detector LED21 and Q21 to provide rebalancing electrical current to the torquer mechanism TQ21 which in turn provides a restoring torque to pendulous mass 80 and 81 via the attachment link 82. As with all accelerometers of this type, the restoring torque will be equal and opposite to the torque produced by the pendulous mass 80 and 81 while under acceleration and the electrical current required to produce this restoring torque is directly proportional to the acceleration along the sensitive axis 86 of the accelerometer. Because of the high closed loop gain of this accelerometer, the angular displacement of the pendulous mass 80 and 81 is very small and the physical movement of the mass 80 with respect to the reference frame 85 of the accelerometer is, for all practical purposes, linear along the sensitive axis 86 of the accelerometer.

The accelerometer of the acceleration sensor means 25 of the apparatus of this invention differs from that of the prior art as follows:

The torquer mechanism TQ21 is a commercially available "D'Arsonval" type meter movement.

The suspension of the armature of the torquer mechanism TQ21 is of the "Taut-Band" type, therefore eliminating the error causing friction that is normally associated with "Pivot & Jewel" type suspensions.

The pendulous mass 80 and 81 is a small, spade shaped, metal flag which is affixed to the armature 83 of the torquer mechanism TQ21 at the location 82 where the pointer would be attached if the torquer mechanism TQ21 were to be used as a meter movement as it is normally intended.

The position detector is comprised of an "Infared" light emitting diode LED21 and a phototransistor Q21. This type of position detector LED21 and Q21 is generally superior to other types of position detectors as the light beam has no effect on the position of the mass 80.

The broad portion 80 of the pendulous mass 80 and 81 serves not only as the major portion of the mass for the pendulous mass 80 and 81 but also serves to occlude a portion of the light beam of the position detector LED21 and Q21, therefore providing a means whereby the position detector (LED21 and Q21) may sense the position of the mass 80 with respect to the reference frame 85 of the accelerometer.

The error amplifier IC21 serves to improve the response characteristics of the accelerometer by buffering the output of the position detector LED21 and Q21, by providing a bilateral electrical current source for the torquer mechanism TQ21 for both positive and negative acceleration and by providing a means whereby the phase/gain characteristics of the closed loop of the accelerometer may be tailored.

In addition to the above, the need for heavy viscous or electrical damping has been eliminated without sacrificing the high frequency response characteristics of the accelerometer by the inclusion of the electrical lead networks 87 and 88 which are comprised of R23 and C21 and R27 and C22, respectively. The closed-loop gain of most force-balance accelerometers tends to roll off at a rate of greater than 6 dB per octave. As the loop gain passes through unity gain, the loop tends to either overshoot or oscillate. Those skilled in the art have generally corrected this condition by heavily damping the loop of the accelerometer with electrical lag networks or through the use of high viscosity damping fluids. This method of stablizing the loop gain characteristics most often resulted in a reduction of the high frequency response characteristics of the accelerometer. The electrical lead networks 87 and 88, which have been included in the feedback and output of the error amplifier IC21, serve to flatten the closed-loop response characteristics of the accelerometer of the acceleration sensor means 25 of the apparatus of this invention to the point where the loop passes through unity gain at no greater than 6 dB per octave.

Therefore, the loop tends to neither oscillate nor overshoot as a result of the electrical affects of these networks 87 and 88. The accelerometers of the prior art were typically designed to develop an output voltage across a fixed resistor whereas the accelerometer of this invention is designed to deliver an electrical current into a low impedance. This electrical output current is made available at the output lead 26 of the acceleration sensor means 25. The most significant feature of the acceleration sensor means 25 of the apparatus of this invention is that it is very inexpensive to manufacture as a direct result of the utilization of the commercially available meter movement as a torquer mechanism TQ21.

It would be within the scope of this invention to replace the above acceleration sensor means 25 with a commercially available accelerometer which meets the following electrical output requirements:

Output current: 100 microamps to 10 milliamps per "G" of acceleration

Frequency response: Static to 20 hertz

Suitable commercially available accelerometers, for example, are the Sundstrand Model 2180, Mini-Pal Servo Accelerometer or the Systron Donner #4310 Linear Servo Accelerometer.

Attenuation Network Means 27

Figure 5:
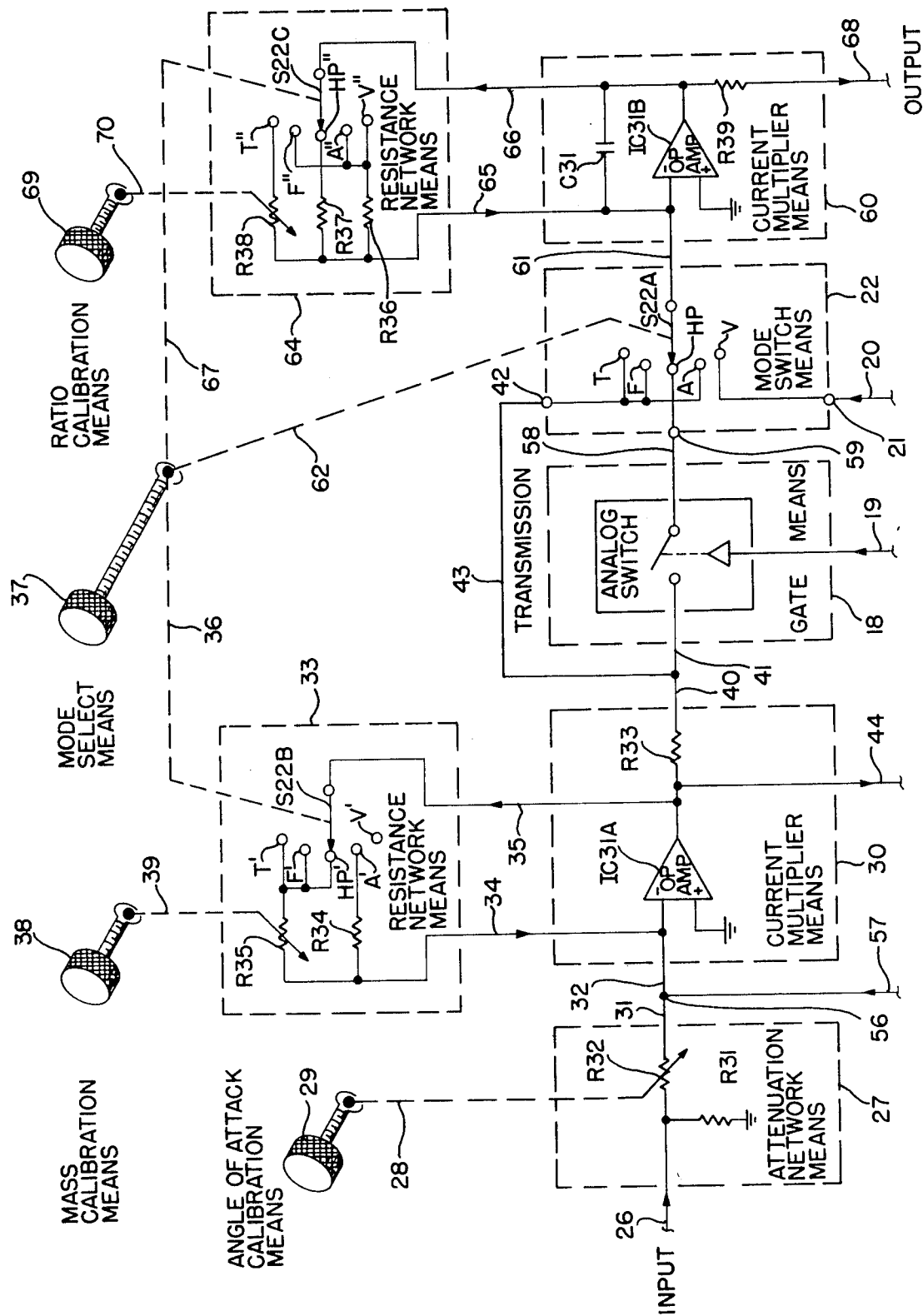
FIG. 5 is a schematic diagram of the main portion of the circuitry of the apparatus including the attenuation network means 27, angle of attack calibration means 29, current multiplier means 30, resistance network means 33, mass calibration means 38, transmission gate means 18, mode switch means 22, mode select means 37, current multiplier means 60, resistance network means 64 and ratio calibration means 69.

Referring to FIG. 5; the attenuation network means is a low impedance resistance network which satisfies the low impedance output requirements of the acceleration sensor means 25. The electrical input current, lead 26, of the attenuation network means 27 is passed through the potentiometer R32 to the output, lead 31, of the attenuation network means 27. This output current is provided to the input of the current multiplier means 30, which appears to be a virtual ground. If the value of the potentiometer R32 is zero, then the voltage across the resistor R31 will also be zero and the current flow through the resistor R31 will be zero, regardless of the amount of input current to the attenuation network means 27. As the resistance value of the potentiometer R32 is increased, the voltage drop across the potentiometer R32 and resistor R31 will increase and a portion of the input current to the attentuation network means 27 will be shunted to ground by the resistor R31. This shunting action reduces the amount of the electrical current that is available at the output, lead 31, of the attenuation network means 27, thus reducing the sensitivity of the apparatus of this invention. The amount of attenuation by the attenuation network means 27 may be varied by the adjustment of the value of the potentiometer R32. For this purpose, the potentiometer R32 is coupled by any prior art means 28 to a knob. This knob is the angle of attack calibration means 29.

Current Multiplier Means 30

Referring to FIG. 5, the electrical current that is available at the input lead 32 of the current multiplier means 30 is fed to the inverting input of the operational amplifier IC31A. This amplifier IC31A serves to amplify the electrical input current of the current multiplier means 30 by an amount that is determined by the resistance value of the feedback network that is connected from the output to the inverting input of the operational amplifier IC31A. This feedback network is the resistance network means 33 which is connected to the current multiplier means 30 via leads 34 and 35. The amplified signal appears as an electrical potential at the output lead 44 and as an electrical current at the output lead 40 of the current multiplier means 30.

Resistance Network Means 33

Referring to FIG. 5 the resistance that appears between the leads 34 and 35 of the resistance network means 33 serves to control the current multiplication ratio of the current multiplier means 30. The value of this resistance is determined by either the resistor R34 or the decade rheostate R35. The resistor R34 or decade rheostat 35 is selected by the switch S22B which is ganged with the switches S22A and S22C and the mode select means 37. When the switch S22B is in position A', the resistor R34 will be selected and the current multiplier means 30 will be caused to operate in the acceleration configuration. When the switch is in the positions HP', F' or T', the decade rheostat R35 will be selected and the current multiplier means 30 will be caused to operate in the force configuration. (Note: When properly adjusted, the resistance value of the decade rheostat will be directly related to the mass of the vehicle.)

For the purpose of adjustment of the value of the resistance of the decade rheostat R35, the decade rheostat is coupled by any prior art means 39 to a knob arrangement with a calibrated readout. This knob arrangement with a calibrated readout is the mass calibration means 38.

The decade rheostate R35 and the knob arrangement with calibrated readout 38 may be that of any prior art means, including but not limited to thumbwheel switch controlled resistance networks, multi-turn potentiometers with counter dials and electronically controlled resistance networks with electronic display devices. The current multiplier means 30 and resistance network means 33 may be replaced with a multiplying digital-toanalog converter with the mass calibration means 38 becoming a means of digitally programming a digital word into the multiplying digital-to-analog converter, the value of this digital word being directly related to the mass of the vehicle.

Computer Means 15

Figure 6:
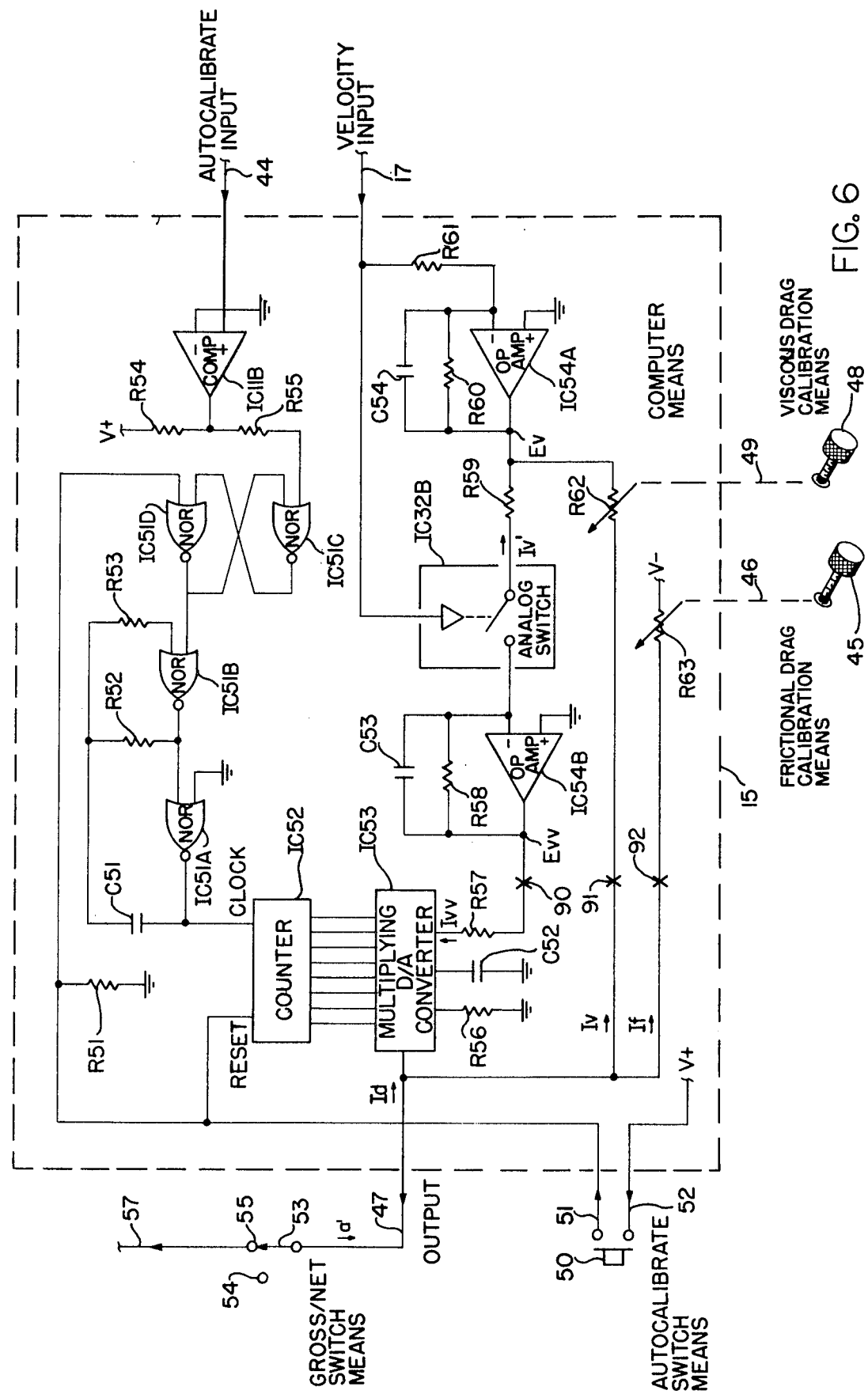
FIG. 6 illustrates the computer means 15 in schematic form. The frictional drag calibration means 45, viscous drag calibration means 48, autocalibrate switch means 50 and gross/net switch means 53 are also depicted in this drawing.

Referring to FIG. 6 when the gross/net switch means 53 is in the closed position 55 the output, lead 47, of the computer means 15 will be working into the input of the current multiplier means 30. As the input to the current multiplier means 30 appears to be a virtual ground, the electrical potential at the output of the computer means will be zero with respect to the ground of the apparatus and the amount of electrical current flow in the output of the computer means 15 will be the sum of all the electrical currents that are made available at the output of the computer means 15. The potentiometer R63, being connected between the output lead 47 of the computer means 15 and the negative rail V− of the apparatus, serves to establish an electrical current flow [If] in the output of the computer means 15. The amount of electrical current [If] may be varied by the adjustment of the resistance value of the potentiometer R63. For this purpose, the potentiometer R63 is coupled by any prior art means 46 to a knob. This knob is the frictional drag calibration means 45.

The operational amplifier IC54A and its associated components serve to integrate the pulse train which appears at the velocity input lead 17 of the computer means 15. The output of the operational amplifier is an electrical potential [Ev] with a value directly proportional the average electrical value of the pulse train. As the potentiometer R62 is connected between the output of the computer means 15 and the output of the operational amplifier IC54A, an electrical current flow [Iv] will be established in the output of the computer means 15. The amount of electrical current flow [Iv] will be dependent on the value of the electrical potential [Ev] and the resistance value of the potentiometer R62. Therefore the amount of additional electrical current flow [Iv] in the output lead 47 of the computer means 30 will be directly proportional to the average electrical value of the pulse train which appears at the velocity input and inversely proportional to the value of the potentiometer R62. The initial value of the electrical current [Iv] may be varied by the adjustment of the resistance value of the potentiometer R62. For this purpose the potentiometer R62 is coupled by any prior art means 49 to a knob 48. This knob is the viscous drag calibration means.

The electrical potential [Ev] which appears at the output of the operational amplifier IC54A is converted to an electrical current [Iv'] by the resistor R59. This electrical current [Iv'] is made available at the input of the analog switch IC32B. The analog switch IC32B serves to pass or not pass to the input of the operational amplifier IC54B the electrical current [Iv']. The pass-/no pass (on-off) function of the analog switch IC32B is controlled by the pulse train which appears at the velocity input, lead 17, of the computer means 15. Each time a pulse appears at the velocity input, the analog switch will turn on and pass the electrical current [Iv'] to the input of the operational amplifier IC54B.

The operational amplifier IC54B and its associated components serve to integrate the electrical current pulses which are provided to the input of the operational amplifier IC54B by the analog switch IC32B. The output of the operational amplifier IC54B is an electrical potential [Evv] with a value directly proportional to the average electrical value of the pulse train which appears at the velocity input, lead 17, of the computer means 15 multiplied by the duty cycle of the same pulse train. Therefore, the value of the electrical potential [Evv] will be directly proportional to the square of the average electrical value of the pulse train appearing at the velocity input. The electrical potential [Evv] is converted to an electrical current [Ivv] by the resistor R57. This electrical current [Ivv] provides a reference current for the multiplying digital-to-analog converter IC53. The output of the multiplying digital-to-analog converter IC53 will be an electrical current [Id] with a value directly proportional to the electrical current [Ivv] multiplied by the value of the digital word that is provided to the multiplying digital-to-analog converter IC53 by the counter IC52. The electrical current [Id] is therefore directly proportional to the square of the average electrical value of the pulse train which appears at the velocity input, lead 17, of the computer means 15 multiplied by the value of the digital word provided by the counter IC52. Since the output of the multiplying digital-to-analog converter IC53 is connected to the output, lead 47, of the computer means 15, the electrical current [Id] will be summed with the electrical currents [If] and [Iv] to provide a total electrical current flow [a'] in the output lead 47 of the computer means 15 that is equal to (If+Iv+Id).

When the autocalibrate switch means 50 is momentarily closed, the counter IC52 will be reset and the value of the digital word that is provided to the multiplying digital-to-analog converter IC53 by the counter IC52 will become zero. The closure of the switch 50 also causes the set-reset flip/flop IC51C and IC51D to be set, thus starting the clock IC51A and IC51B. Upon the opening of the switch 50, the clock will cause the counter IC52 to count up from zero. When the digital word that is provided by the counter IC52 reaches the proper value, the electrical potential at the autocalibrate input, lead 44, of the computer means 15 will pass through zero, thus causing the set-reset flip/flop IC51C and IC51D to be reset by the comparator IC11B. This resetting of the set-reset flip/flop IC51C and IC51D stops the clock IC51A and IC51B, thus terminating the advancing count of the counter IC52. The digital word that is provided to the multiplying digital-to-analog converter IC53 will then remain fixed at the value of the last count prior to the termination of the counting process.

Within the scope of this invention the multiplying digital-to-analog converter IC53 and its associated circuitry may be replaced with a manually operated potentiometer.

Transmission Gate Means 18

Referring to FIG. 5, the transmission gate means 18 is by definition the solid-state equivalent of a relay, having terminals that are connected to each other or not depending on the application of a separate control voltage. In the preferred embodiment of this invention the transmission gate means 18 is comprised of an analog switch IC32A which satisfies the requirements of the above definition and has the following characteristics:

Fully bilateral, i/e: conducts equally well in both directions.

Linear, i/e: transmits an analog signal without distortion.

Low "on" resistance.
High "off" resistance.
Essentially zero offset voltage.
Does not exhibit bipolar type saturation characteristics.
Very high isolation between the signal being gated and the control signal.

The analog switch IC32A serves to pass or not pass to the output lead 58 of the transmission gate means 18 the electrical current which is available at the input lead 41 of the transmission gate means 18. The pass/no pass (on-off) function of the analog switch IC32A is controlled by the pulse train which appears at the control input lead 19 of the transmission gate means 18. Each time a pulse appears at the control input 19, the analog switch IC32A will turn on and pass from the input to the output of the transmission gate means 18 the electrical current that is available at the input of the transmission gate means 18.

Although the analog switch IC32A of the transmission gate means 18 is of a "CMOS" type construction, it may be replaced, within the scope of this invention, with an analog switch of any prior art construction, providing that it has the same characteristics as described above.

Mode Switch Means 22

Referring to FIG. 5, the mode switch means 22 is comprised of a single pole, five position switch S22A. This switch is ganged with switches S22B and S22C and the mode select means 37. The switch S22A is wired in such a manner that one of the three electrical input leads 20, 42 or 58 of the mode switch means 22 may be selected by this five position switch S22A. Therefore, for the sake of clarity in the description of the overall operation of the apparatus of this invention, the mode switch means 22 in the block diagram (FIG. 1) of the preferred embodiment of this invention has been depicted as a three position switch, whereas the switch S22A of the mode switch means 22 in the schematic, FIG. 5, is shown as a five position switch. When the switch S22A is in position V, the input lead 20 will be connected to the output lead 61 of the mode switch means 22.

This position V corresponds to position 21 of the mode switch means 22 of FIG. 1. When the switch S22A is in position A, F or T, the input lead 43 will be connected to the output lead 61 of the mode switch means 22. These positions A, F or T correspond to position 42 of the mode switch means 22 of FIG. 1. When the switch S22A is in position HP, the input lead 58 will be connected to the output lead 61 of the mode switch means 22. This position HP corresponds to position 59 of the mode switch means 22 of FIG. 1. For the purpose of the proper positioning of the mode switch means 22 for each mode of operation, the mode switch means 22 is coupled by any prior art means 62 to a knob 37. This knob is the mode select means.

Current Multiplier Means 60

Referring to FIG. 5, the electrical current that is available at the input lead 61 of the current multiplier means 60 is fed to the inverting input of the operational amplifier IC31B. This amplifier and its associated components serve to amplify and integrate the electrical input current of the current multiplier means 60. The amplification ratio of the amplifier IC31B is determined by the resistance value of the feedback network that is connected from the output to the inverting input of the operational amplifier IC31B. This feedback network is the resistance network means 64 which is connected to the current multiplier means 60 via leads 65 and 66. The amplified signal appears as an electrical current at the output lead 68 of the current multiplier means 60.

Resistance Network Means 64

Referring to FIG. 5; the resistance that appears between the leads 65 and 66 of the resistance network means 64 serves to control the current multiplication ratio of the current multiplier means 60. The value of this resistance is determined by the resistor R36, resistor R37 or the decade rheostat R38. Resistor R36, resistor R37 or the decade rheostat R38 is selected by the switch S22C which is ganged with the switches S22A and S22B and the mode select means 37.

When the switch S22C is in one of positions V", A" or F", the resistor R36 will be selected and the current multiplier means 60 will be caused to operate in the sensitivity configuration. (Note: The resistance value of the resistor R36 is directly related to the constant K" in the calculation process of the apparatus.) When the switch is in position HP", the resistor R37 will be selected and the current multiplier means 60 will be caused to operate in the horsepower configuration. (Note: The resistance value of the resistor R37, is directly related to the constant [K] in the calculation process of the apparatus.) When the switch S22C is in position T", the decade rheostat R38 will be selected and the current multiplier means 60 will be caused to operate in the ratio configuration. (Note: When properly adjusted, the resistance value of the decade rheostat R38 is directly related to the constant [K'] in the calculation process of the apparatus.) For the purpose of adjustment of the value of the resistance of the decade rheostat R38, the decade rheostat is coupled by any prior art means 70 to a knob arrangement with a calibrated readout 69. This knob arrangement with a calibrated readout is the ratio calibration means.

The decade rheostat R38 and the knob arrangement with calibrated readout 69 may be that of any prior art means, including but not limited to thumbwheel switch controlled resistance networks, multi-turn potentiometers with counter dials and electronically controlled resistance networks with electronic display devices.

The current multiplier means 60 and resistance network means 64 may be replaced with a multiplying digital-to-analog converter with the ratio calibration means 69 becoming a means of digitally programming a digital word into the multiplying digital-to-analog converter, the value of this digital word being directly related to the constant [K'] in the calculation process of the apparatus.

Indicating Means 63

Referring to FIG. 5, the indicating means 63 of the apparatus of this invention is a current sensitive indicating device, of any prior art means, with a full-scale current requirement of less than 10 milliamps.

Since the apparatus of this invention may use any of a variety of current sensitive indicating devices, a drawing of the indicating means 63 has not been provided. Examples of suitable devices are Meters produced by Faria Meters Corp or those by Beede Electrical Instrument Co., Penacook, N.H.

The indicating means 63 may be replaced or operated in conjunction with a current sensitive recorder, of any prior art means, with a full-scale current requirement of 10 milliamps or less. Examples of suitable recording means are the M F E Series 4000, OEM Recorder Modules, Models 4144 and 4153.

Under certain conditions of operation, the electrical current which is provided to the indicating means 63 will be the reverse of normal; therefore the indicating means should be capable of indicating both positive and negative electrical currents. If the preferred indicating or recording device is of a unipolar type, i/e: functions properly with the electrical current flowing through the device in one direction only, it would be within the scope of this invention to provide a means of reversing the electrical current between the current multiplier means 60 and the indicating means 63.

METHOD OF USE

The following is an example of how the apparatus of this invention may be utilized to determine (1) the performance characteristics of the prime mover in a moving vehicle and (2) the dynamic vehicular characteristics of the moving vehicle. Assuming that the vehicle to be tested is an automobile or truck of a typical configuration, the installation and calibration of the instrument is as follows:

Installation (1) The apparatus is installed in the vehicle with the sensitive axis of the acceleration sensor 25 parallel to the roadway surface and aligned with the direction of travel of the vehicle.
(2) The velocity sensor means 10, "Beede" model #517526 Signal Generator, is installed in series with the speedometer cable. Other types of velocity sensing devices may be utilized.
(3) The indicating means 63 is positioned in the vehicle in such manner that it is within view of the driver and/or others in the vehicle.
(4) The velocity sensor means 10, indicating means 63 and power source are electrically connected to the apparatus.

Calibration (1) The mass calibration means 38 is adjusted to indicate the weight of the vehicle. For maximum instrument accuracy, the indicated weight must include the weight of the driver and others within the vehicle at the time of testing.
(2) To verify that the sensitive axis of the acceleration sensor means 25 is parallel to the roadway surface, the vehicle is parked on a surface that is known to be level. With the apparatus operating in the net acceleration mode, the indicating means 63 will indicate a value of zero if the sensitive axis of the acceleration means 25 is parallel to the level surface.
(3) The vehicle is then parked, with the drive wheels locked, on an incline or ramp of known inclination. With apparatus operating in the net acceleration mode, the indicating means 63 should indicate a value which is equal to the Sine of the angle of the known inclination. If the indicated value is not correct due to a change in the angle of attack of the vehicle with respect to the roadway surface, the angle of attack calibration means 29 may be adjusted until the indicated value is that of the Sine of the angle of the known inclination.
(4) The drive ratio of the vehicle is determined by the gear ratio between the prime mover and the drive axle of the vehicle divided by the radius of the drive wheels of the vehicle. The ratio calibration means 69 is then adjusted to indicate the reciprocal of this drive ratio value.
(5) The vehicle is then driven at a known speed. With the apparatus opera ting in the velocity mode, the indicating means 63 should indicate a value that is equal to the known velocity. If the proper velocity is not indicated, the velocity calibration means 13 may be adjusted until the value of the indicated velocity agrees with that of the known velo city.
(6) With the apparatus operating in the gross acceleration mode, the vehicle is allowed to coast in neutral at any speed between 40 and 60 mph. The autocalibrate switch means 50 is then momentarily depressed and released. The indicating means 63 should then indicate a value of zero.
(7) The vehicle is then allowed to coast in neutral at any speed between 1 and 5 mph. With the apparatus still operating in the gross acceleration mode, the indicating means 63 should indicate a value of zero. If the indication is not zero, the frictional calibration means 45 may be adjusted until an indication of zero is reached.
(8) If at all possible, the vehicle is then allowed to coast in neutral at a speed of 70 plus mph. With the apparatus still operating in the gross acceleration mode, the indicating means 63 should indicate a value of zero. If the indication is not zero, the viscous drag calibration means 48 may be adjusted until an indication of zero is reached.

After the above installation and calibration procedure has been completed, the apparatus of this invention will be ready to measure any of the following vehicular parameters:

Gross prime mover horsepower
Net prime mover horsepower
Gross prime mover torque
Net prime mover torque
Gross acceleration (+ or −)
Net acceleration (+ or −)
Sine $\theta$ of the roadway incline
Vehicular velocity
Gross force propelling the vehicle
Net force propelling the vehicle
Horsepower dissipated by aerodynamic drag
Horsepower dissipated by frictional drag (optional)
Horsepower dissipated by viscous drag (optional)
Total horsepower dissipated by the combined effects of aerodynamic, frictional and viscous drag
Frictional horsepower of the prime mover or drive train components
Horsepower dissipated by the brakes of the vehicle
Aerodynamic resistance to vehicular motion
Frictional resistance to vehicular motion (optional)
Viscous resistance to vehicular motion (optional)
Total resistance to vehicular motion due to the combined effects of aerodynamic, frictional and viscous drag
Resistance to vehicular motion due to braking of the vehicle
The coefficients of aerodynamic, frictional or viscous drag (optional)

With the exception of the calibration for vehicular mass and aerodynamic drag (autocalibrate), the calibration of the apparatus of this invention is of a "set and forget" nature and should not require recalibration after the initial calibration for the vehicle under test. If there are changes in the weight of the vehicle, i/e: more or less passengers or on-board equipment, step (1) of the calibration procedure should be repeated. Also, under conditions of high winds or large changes in air density, it may become desirable to repeat step (6) of the calibration procedure.

If it is desired to measure the lateral acceleration or force of the vehicle during turning maneuvers, the apparatus must be realigned so that the sensitive axis of the acceleration sensor means 25 is 90 degrees to the direction of travel of the vehicle. An additional acceleration sensor means 25, which may be switched in or out of the circuitry of the apparatus, may be provided for this purpose.

Although the above example is for a typical automobile or truck, the apparatus of this invention is intended for use in any type of moving conveyance, in or on any type of transporting medium, i/e: automobiles, trucks, boats, airplanes, bicycles, rockets, submarines, conveyers and animals, to name but a few. Certain optional circuitry is within the scope of this invention: Referring to FIGS. 5 and 6, additional switching and circuitry may be inserted into the existing circuitry of the computer means 15 at points 90, 91 and 92 to provide a means whereby the apparatus of this invention may determine the following vehicular parameters:

Horsepower dissipated by frictional drag
Horsepower dissipated by viscous drag
Frictional resistance to vehicular motion
Viscous resistance to vehicular motion
The coefficient of frictonal drag
The coefficient of viscous drag
The coefficient of aerodynamic drag With this modification to the preferred embodiment of this invention, (1) either electrical current [If] or [Iv] will be disconnected from the output, lead 47, of the computer means 15 while in the frictional horsepower or viscous horsepower modes of operation, respectively; (2) either electrical current [If] or [Iv] will be disconnected from the output, lead 47, of the computer means 15 while in the frictional resistance or viscous resistance modes of operation, respectively; (3) either electrical current [If] or [Iv] will be provided to additional contacts of the mode switch means S22A while in the coefficient of frictional drag or coefficient of viscous drag modes of operation, respectively; and while in the coefficient of aerodynamic drag mode of operation, an electronically variable resistance whose value is directly proportonal to the reciprocal of the aerodynamic drag on the vehicle under test will be provided to the circuitry within the resistance network means 64.

The above descriptions relate to a proven, practical, economical embodiment of the invention. From the above description, however, it will be clear to those skilled in the art that the primary purpose of the circuitry within the apparatus of the preferred embodiment of this invention is to process the electrical output signals of the velocity sensor means 10 and acceleration sensor means 25 according to the equations (e) thru (o) while providing an electrical output current that is appropriate for the span of the indicating means 63 for each mode of operation of the apparatus. Therefore, being aware of the theory of operation of the preferred embodiment of this invention, it will be clear to those skilled in the art that the circuitry within the apparatus of this invention may be replaced, in whole or part, by a digital computer of any prior art means, providing that it has the appropriate analog to digital and digital-to-analog converts along with sufficient operating speed to provide the equivalent of "Real Time" vehicular parameter measurements. With a modification of this type to the preferred embodiment of this invention, the programming means of the digital computer would become the means of calibrating the apparatus with respect to velocity, angle of attack, mass, frictional drag, viscous drag, aerodynamic drag, and drive ratio, while the means of selecting the appropriate program for each mode of operation would replace the mode select means 37, mode switch mean 22, and gross/net switch means 53.

A further option of the method and apparatus relates to vehicles such as aircraft and sailboats. With such vehicles the prime mover and drag parameters are more significantly influenced by the wind velocity and direction relative to vehicle velocity and direction. In such cases means are provided for sensing wind velocity and direction relative to the vehicle as well as means for integrating the sensed information into the calculation and display of appropriate performance parameters.

The preferred embodiment and method of the subject invention have been described, along with various optional embodiment features and method steps. Still other variations in both the apparatus and method will occur to those skilled in the art. However, the scope of the invention is limited only by the scope of the appended claims.

I claim:

1. Apparatus, for use in a vehicle having a prime mover, a mass and a direction of motion, for providing instantaneous indication of the gross horsepower output of the prime mover comprising:
   (a) means for generating a signal with a value continuously proportional to the instantaneous inertial acceleration of the vehicle, said means having a sensitive axis adjustable to be parallel to the direction of motion of said vehicle;
   (b) means for generating a signal with a value continuously proportional to the instantaneous velocity of the vehicle and further comprising means for adjusting said generating means to account for the drive ratio of said vehicle;
   (c) means for providing a signal with a value continuously proproportional to the aerodynamic drag of the vehicle and further comprising means for adjusting said means to calibrate said means to accurately represent the aerodynamic characteristics of the vehicle;
   (d) means for providing a signal with a value continuously proportional to the friction drag of the vehicle and further comprising means to calibrate said means to accurately represent the frictional drag characteristics of the vehicle;
   (e) means for providing a signal with a value continuously proportional to the viscous drag of the vehicle and further comprising means to calibrate said means to accurately reflect the viscous drag characteristics of the vehicle;
   (f) means for providing a signal proportional to the mass of the vehicle multiplied by the acceleration of the vehicle;
   (g) means for accepting said signals and providing a signal having a value proportional to said gross horsepower;
   (h) means for accepting a signal having a value proportional to an operating parameter of said vehicle and providing a visual indication of the value of said signs.

2. The apparatus of claim 1, further comprising switching means for applying any one of said signals a,b,c,d,e or f to said means for accepting a signal and providing an indication of the value of said applied signal.

3. The apparatus of claim 1, further comprising means for adjusting the value of the signal representative of said mass of said vehicle multipled by the acceleration of said vehicle to accurately represent the mass of the vehicle in which the apparatus is used.

4. The apparatus of claim 1, further comprising means for adjusting said means for providing a signal with a value continuously proportional to the velocity of the vehicle so that said signal accurately represents the velocity of the vehicle in which the apparatus is used.

5. The apparatus of claim 1, further comprising means for adjusting the means for generating signals with values continuously proportional to aerodynamic drag, friction drag and viscous drag so that the signals accurately reflect the aerodynamic, friction and viscous drag characteristics of the vehicle in which the apparatus is used.

6. The apparatus of claim 1, further comprising means for adjusting the apparatus to compensate for the effect of changes in the angle of attack of the vehicle.

7. The apparatus of claim 1, further comprising switching means for applying any one of said signals a,b,c,d,e,f or g to said means for accepting a signal and providing an indication of the value of said applied signal and means for adjusting the value of the signal representative of said mass of said vehicle multiplied by the acceleration of said vehicle to accurately represent the mass of the vehicle in which the apparatus is used.

8. The apparatus of claim 1, further comprising switching means for applying any one of said signals a,b,c,d or e to said means for accepting a signal and providing an indication of the value of said applied signal and means for adjusting said means for providing a signal with a value continuously proportional to the velocity of the vehicle so that said signal accurately represents the velocity of the vehicle in which the apparatus is used.

9. The apparatus of claim 1, further comprising switching means for applying any one of said signals a,b,c,d or e to said means for accepting a signal and providing an indication of the value of said applied signal and means for adjusting the means for generating signals with values continuously proportional to aerodynamic drag, friction drag and viscous drag so that the signals accurately reflect the aerodynamic, friction and viscous drag characteristics of the vehicle in which the apparatus is used.

10. The apparatus of claim 1, further comprising switching means for applying any one of said signals a,b,c,d or e to said means for accepting a signal and providing an indication of the value of said applied signal and means for adjusting the apparatus to compensate for the effect of changes in the angle of attack of the vehicle.

11. The apparatus of claim 1, further comprising switching means for applying any one of said signals a,b,c,d or e to said means for accepting a signal and providing an indication of the value of said applied signal and means for adjusting the value of the signal representative of said mass of said vehicle multiplied by the acceleration of said vehicle to accurately represent the mass of the vehicle in which the apparatus is used and means for adjusting said means for providing a signal with a value continuously proportional to the velocity of the vehicle so that said signal accurately represents the velocity of the vehicle in which the apparatus is used.

12. The apparatus of claim 1, further comprising switching means for applying any one of said signals a,b,c,d or e to said means for accepting a signal and providing an indication of the value of said applied signal and means for adjusting the value of the signal representative of said mass of said vehicle multiplied by the acceleration of said vehicle to accurately represent the mass of the vehicle in which the apparatus is used and means for adjusting the means for generating signals with values continuously proportional to aerodynamic drag, friction drag and viscous drag so that the signals accurately reflect the aerodynamic, friction and viscous drag characteristics of the vehicle in which the apparatus is used.

13. The apparatus of claim 1, further comprising switching means for applying any one of said signals a,b,c,d or e to said means for accepting a signal and providing an indication of the value of said applied signal and means for adjusting the value of the signal representative of said mass of said vehicle multiplied by the acceleration of said vehicle to accurately represent the mass of the vehicle in which the apparatus is used and means for adjusting the apparatus to compensate for the effect of changes in the angle of attack of the vehicle.

14. The apparatus of claim 1, further comprising switching means for applying any one of said signals a,b,c,d or e to said means for accepting a signal and providing an indication of the value of said applied signal, means for adjusting the value of the signal representative of said mass of said vehicle multiplied by the acceleration of said vehicle to accurately represent the mass of the vehicle in which the apparatus is used, means for adjusting said means for providing a signal with a value continuously proportional to the velocity of the vehicle so that said signal accurately represents the velocity of the vehicle in which the apparatus is used and means for adjusting the means for generating signals with values continuously proportional to aerodynamic drag friction drag and viscous drag so that the signals accurately reflect the aerodynamic, friction and viscous drag characteristics of the vehicle in which the apparatus is used.

15. The apparatus of claim 1, further comprising switching means for applying any one of said signals a,b,c,d or e to said means for accepting a signal and providing an indication of the value of said applied signal, means for adjusting the value of the signal representative of said mass of said vehicle multiplied by the acceleration of said vehicle to accurately represent the mass of the vehicle in which the apparatus is used, means for adjusting said means for providing a signal with a value continuously proportional to the velocity of the vehicle so that said signal accurately represents the velocity value continuously proportional to the velocity of the vehicle so that said signal accurately represents the velocity of the vehicle in which the apparatus is used and means for adjusting the apparatus to compensate for the effect of changes in the angle of attack of the vehicle.

16. The apparatus of claim 1, further comprising switching means for applying any one of said signals a,b,c,d or e to said means for accepting a signal and providing an indication of the value of said applied signal, means for adjusting the value of the signal representative of said mass of said vehicle multiplied by the acceleration of said vehicle to accurately represent the mass of the vehicle in which the apparatus is used, means for adjusting said means for providing a signal with a value continuously proportional to the velocity of the vehicle so that said signal accurately represents the velocity of the vehicle in which the apparatus is used and means for adjusting the means for generating signals with values continuously proportional to aerodynamic drag, friction drag and viscous drag so that the signals accurately reflect the aerodynamic, friction and viscous drag characteristics of the vehicle in which the apparatus is used.

17. The apparatus of claim 1, further comprising switching means for applying any one of said signals a,b,c,d or e to said means for accepting a signal and providing an indication of the value of said applied signal, means for adjusting the value of the signal representative of said mass of said vehicle multiplied by the acceleration of said vehicle to accurately represent the mass of the vehicle in which the apparatus is used, means for adjusting said means for providing a signal with a value continuously proportional to the velocity of the vehicle so that said signal accurately represents the velocity of the vehicle in which the apparatus is used, means for adjusting the means for generating signals with values continuously proportional to aerodynamic drag, friction drag and viscous drag so that the signals accurately reflect the aerodynamic, friction and viscous drag characteristics of the vehicle in which the apparatus is used and means for adjusting the apparatus to compensate for the effect of changes in the angle of attack of the vehicle.

18. The apparatus in claim 1,2,3,4,5,6,7,8,9,10,11,12,13,14,15,16 or 17 further comprising means for adjusting said means for accepting a signal and providing a visual indication of the value of said signal to provide a full-scale indication of said value of said signal.

19. In a vehicle having a prime mover and indicating means including means for accepting a signal and providing a visual indication of the value of said signal to provide a full-scale indication of said value of said signal and means for adjusting said means for accepting a signal and providing a visual indication of the value of said signal to provide a full-scale indication of said value of said signal, a method for providing a signal having a value proportional to the instantaneous gross horsepower produced by said prime mover and providing a visual indication of the value of the gross horsepower, comprising the steps of:
(a) providing electrical signals having values representative of certain characteristics of the vehicle, including its mass,
(b) generating signals with values continuously proportional to:
(1) the instantaneous inertial acceleration of the vehicle;
(2) the instantaneous velocity of the vehicle;
(3) the instantaneous aerodynamic drag of the vehicle;
(4) the instantaneous friction drag of the vehicle and
(5) the instantaneous viscous drag of the vehicle;
(c) using the values of steps a and b in computing a signal representative of the gross horsepower being instantaneously produced by the prime mover,
(d) applying the signal computed in step c to said indicating means whereby the indicating means indicates the value of the instantaneous gross horsepower produced by the prime mover.

20. The method of claim 19, further comprising the steps of:
(e) determining the value of the coasting acceleration of the vehicle while
(f) simultaneously adding said value into the computing step d for calculation of gross horsepower and
(g) multiplying the value of said signal having a value proportional to instantaneous acceleration of the vehicle by the value of said signal having a value proportional to instantaneous velocity of the vehicle simultaneously with the generation of said signals.

21. The method of claim 20, further comprising the step of:
(d) adjusting said means for adjusting said means for accepting a signal and providing an indication of the value of said signal to provide a full scale indication of said signal.

22. The method of claim 19, further comprising the step of:
(e) adjusting said means for adjusting said means for accepting a visual indication of the value of said signal to provide a full scale indication of said signal.

23. In a vehicle having a prime mover, a mass, a computer, an indicating means, a scale adjusting means, a switching means, mode select means and means for driving said switching means by said mode select means, a method for providing signals having values proportional to certain dynamic parameters of said vehicle and providing a display of the instantaneous value of any one of said signals comprising the steps of:
(a) providing electrical signals having values representative of certain characteristics of the vehicle including its mass,
(b) generating signals with values continuously proportional to various parameters comprising:
(1) the instantaneous inertial acceleration of the vehicle,
(2) the instantaneous velocity of the vehicle;
(3) the instantaneous aerodynamic drag of the vehicle,
(4) the instantaneous friction drag of the vehicle and
(5) the instantaneous viscous drag of the vehicle;
(c) operating said mode select means to select certain of the signals of steps a and b for input to said computer,
(d) inputting said selected signals to said computer to provide a signal having a value proportional to:
(1) instantaneous accelaration of the vehicle,
(2) force driving the vehicle,
(3) resistance to motion of the vehicle,
(4) torque produced by the prime mover,
(5) instantaneous velocity of the vehicle,
(6) instantaneous gross horsepower of the prime mover, or
(7) instantaneous net horsepower of the prime mover;
(e) applying the signal of step d to said indicating means to provide an indication of the value of the parameter represented by the signal.

24. The method of claim 23, further comprising the steps of:

(f) determining the value of the coasting acceleration of the vehicle while
(g) simultaneously adding said value into the computing step d for calculation of gross horsepower and
(h) multiplying the value of said signal having a value proportional to instantaneous acceleration of the vehicle by the value of said signal having a value proportional to instantaneous velocity of the vehicle simultaneously with the generation of said signals.

25. The method of claim 24, further comprising the step of:
(i) adjusting said scale adjusting means to provide a full scale indication of said signal of step d.

26. The method of claim 23 further comprising the step of:
(f) adjusting said scale adjusting means to provide a full scale indication of said signal of step d.

27. Apparatus for use in a vehicle having a prime mover, for determining and displaying the instantaneous gross horsepower of said prime mover, the apparatus comprising:

(a) means for providing a signal with a value directly proportional to the instantaneous acceleration of said vehicle,
(b) means for providing a signal with a value directly proportional to the instantaneous velocity of said vehicle;
(c) means for providing a signal with a value representing the mass multiplied by the acceleration of said vehicle;
(d) means for providing a signal with a value directly proportional to the force propelling the vehicle;
(e) means for providing a signal with a value directly proportional to the sum of forces tending to resist vehicle motion,
(f) means for utilizing said signals from said means a,b,c,d and e in computing a signal with a value proportional to the instantaneous gross horsepower output of said prime mover;
(g) means for utilizing said signal provided by said means f and providing a visual indication of said gross horsepower output.

* * * * *